United States Patent [19]

Tychonievich et al.

[11] Patent Number: 4,916,633

[45] Date of Patent: Apr. 10, 1990

[54] EXPERT SYSTEM APPARATUS AND METHODS

[75] Inventors: Louis P. Tychonievich, Derry; Richard W. Bolling, Nashua, both of N.H.

[73] Assignee: Wang Laboratories, Inc., Lowell, Mass.

[21] Appl. No.: 30,250

[22] Filed: Mar. 24, 1987

Related U.S. Application Data

[63] Continuation of Ser. No. 766,860, Aug. 16, 1985, abandoned.

[51] Int. Cl.$^4$ ............................................. G06F 11/00
[52] U.S. Cl. .................................. 364/513; 364/200; 364/274.5; 364/900; 364/917.94
[58] Field of Search ................. 364/200, 417, 513, 900

[56] References Cited

U.S. PATENT DOCUMENTS

| | | | |
|---|---|---|---|
| 3,715,730 | 2/1973 | Smith et al. | 364/200 |
| 3,716,840 | 2/1973 | Masten et al. | 364/200 |
| 4,286,330 | 8/1981 | Isaacson | 364/900 |
| 4,290,114 | 9/1981 | Sinary | 364/900 |
| 4,599,692 | 7/1986 | Tan et al. | 364/513 |
| 4,649,515 | 3/1987 | Thompson et al. | 364/513 |

*Primary Examiner*—Salvatore Cangialosi
*Attorney, Agent, or Firm*—Michael H. Shanahan; Gordon E. Nelson

[57] ABSTRACT

An expert system shell and expert systems created thereby. The expert system shell creates a knowledge base consisting of terms and their definitions, the definitions making up a hierarchy of definitions in which each definition depends only on definitions at lower levels in the hierarchy or on values obtained from sources external to the knowledge base. The expert system shell creates the knowledge base by asking the expert to define a given term and then asking him to define all undefined terms which appear in the definition of the given term. Because the hierarchy is created in this fashion, the definitions are guaranteed to be complete and non-contradictory. Expert systems created using the expert system shell employ an inferencing engine which determines the value of a given term by evaluating its definition. In the course of the evaluation, the definitions of terms required to define the given term are evaluated and external values required for the evaluation of the definitions are obtained. Users of the expert system may inquire of the system why it is seeking a given external value and how it obtained the results it did.

35 Claims, 9 Drawing Sheets

DEFINITIONAL EXPERT SYSTEM SHELL 201 AND EXPERT SYSTEM 202

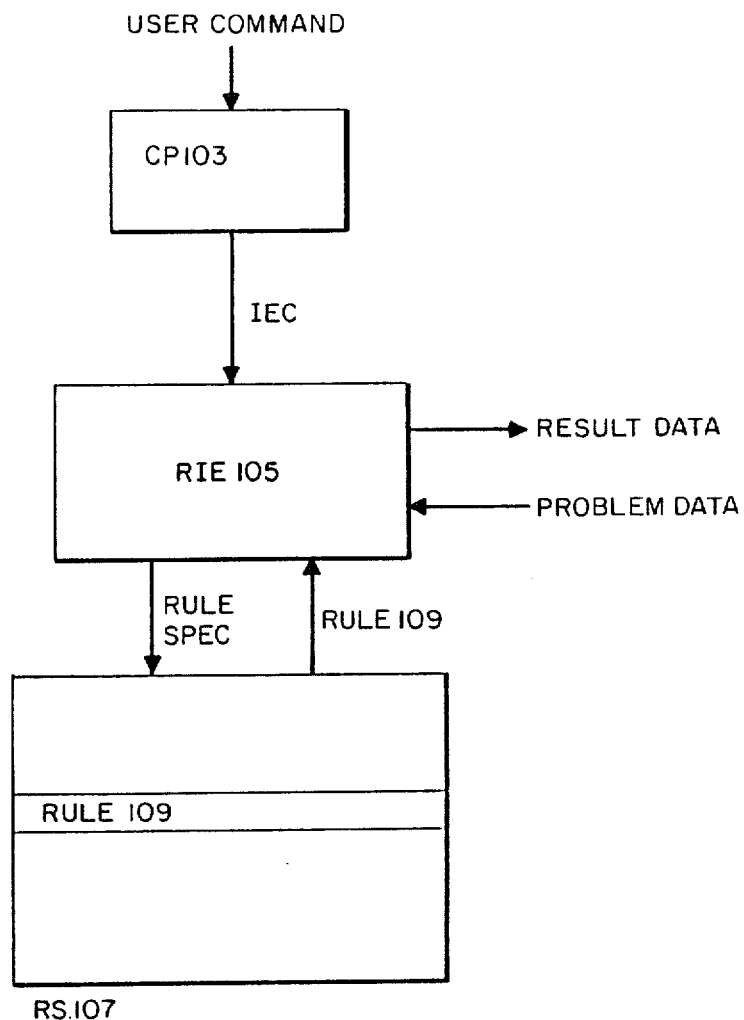
FIG. 1: PRIOR-ART EXPERT SYSTEM 101

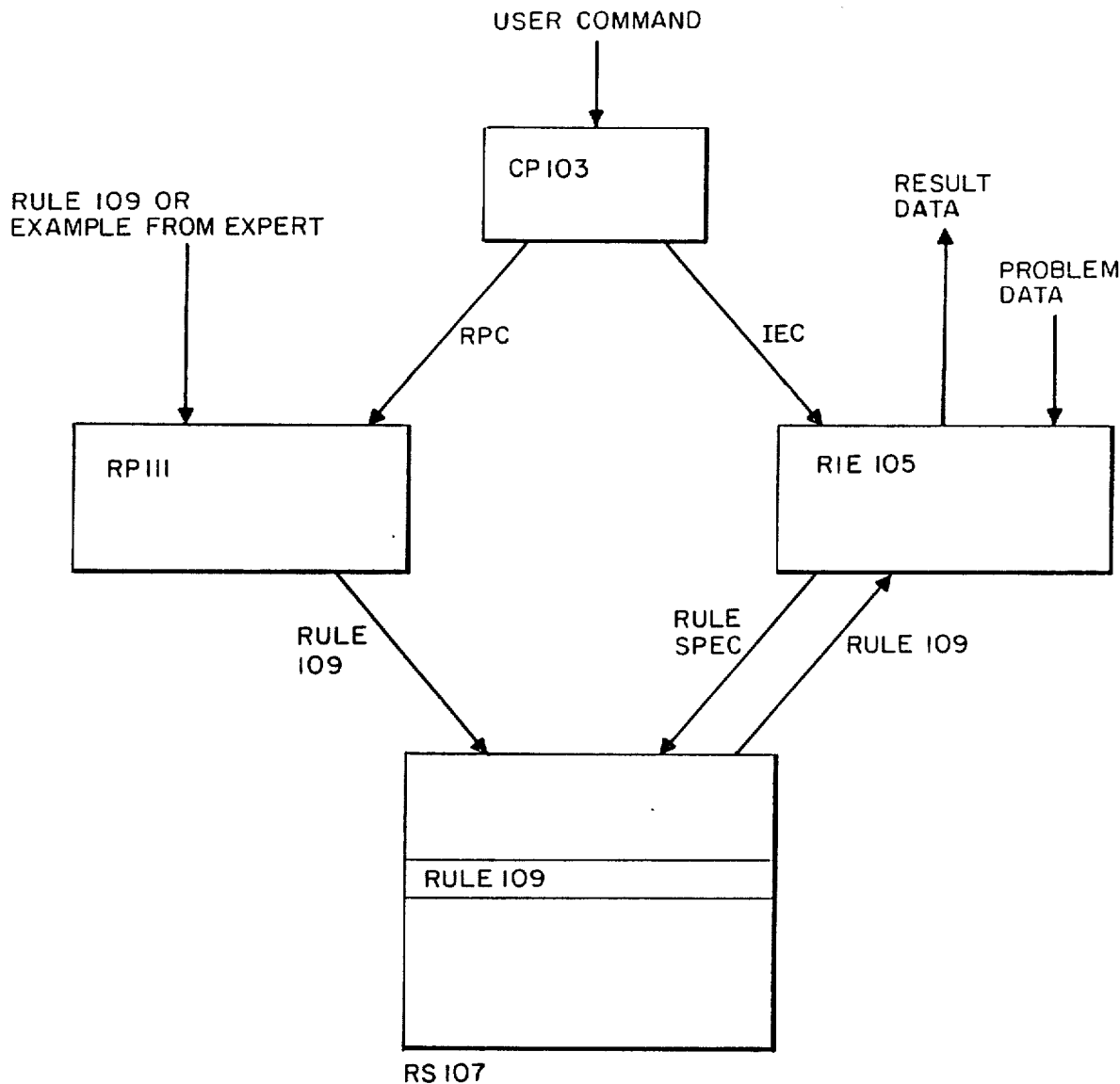
FIG. 1A: PRIOR-ART EXPERT SYSTEM SHELL 110

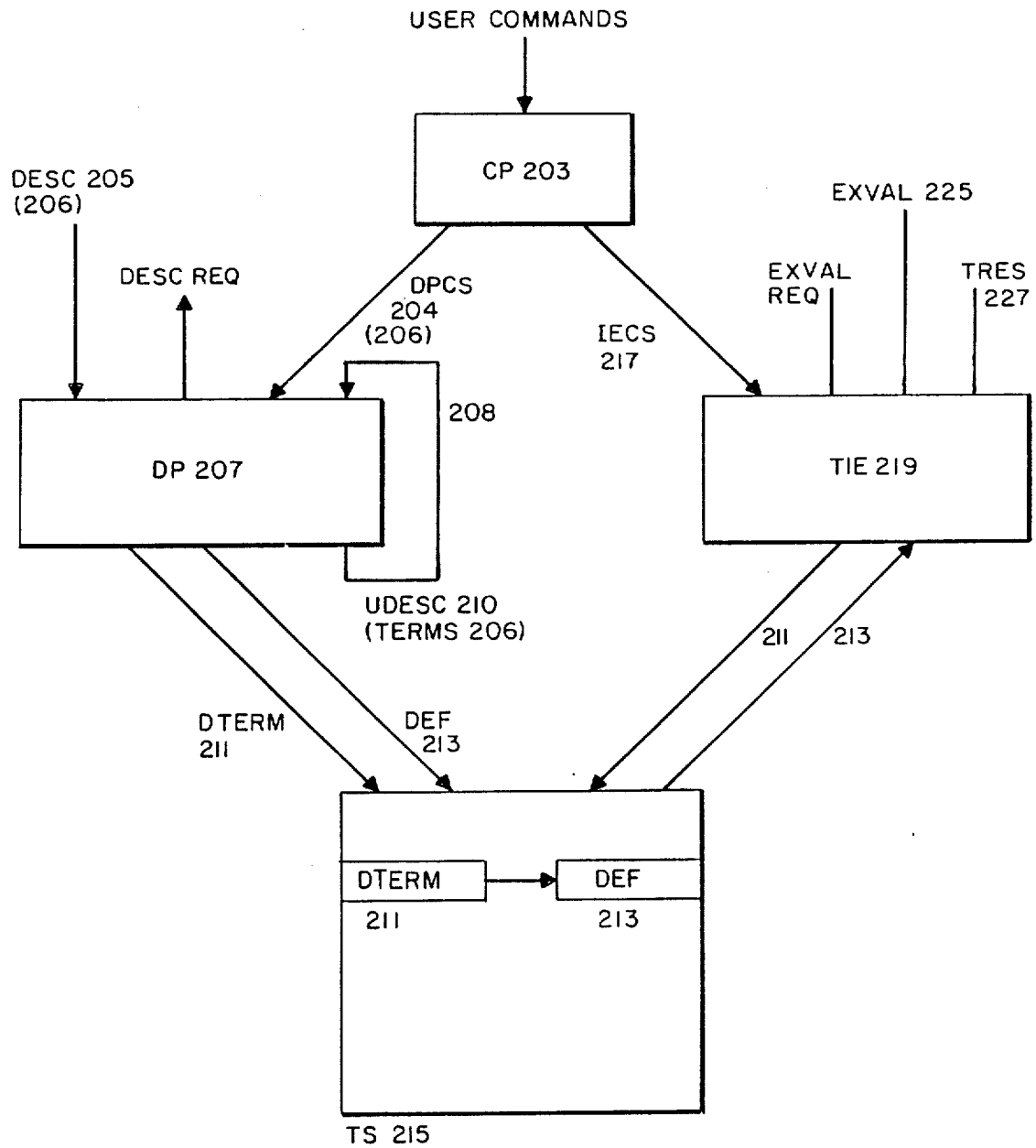
FIG. 2: DEFINITIONAL EXPERT SYSTEM SHELL 201 AND EXPERT SYSTEM 202

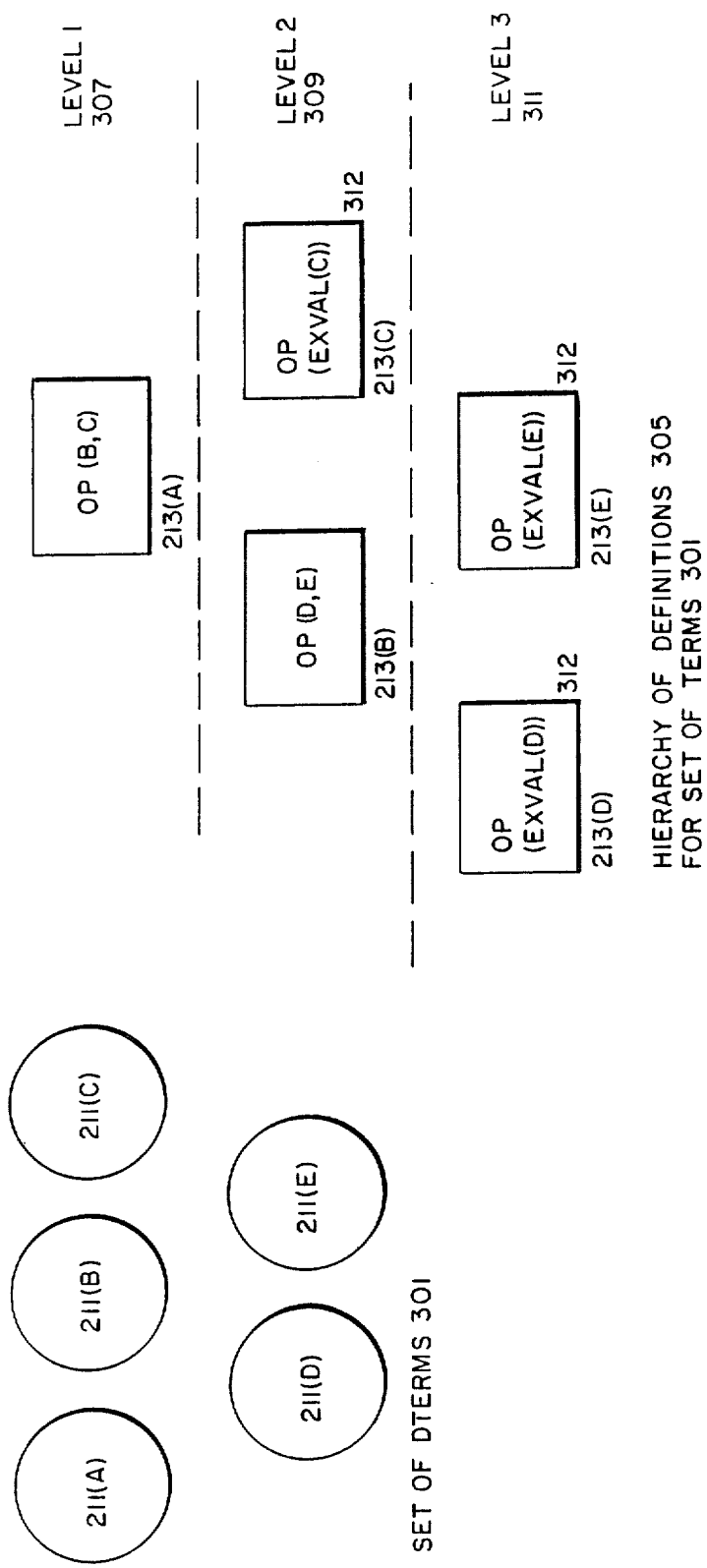
FIG. 3: DTERMS 211 DEFINED WITH HIERARCHY OF DEFS 213

| TERM 206 | DESC 205 |
|---|---|
| FRAUD | KNOWING — MISREPRESENTATION AND DETRIMENTAL — RELIANCE |
| KNOWING — MISREPRESENTATION | MISREPRESENTATION AND DEFENDANT — KNEW — MISREPRESENTATION |
| MISREPRESENTATION | ASK YES—NO "DID HE TELL YOU ANYTHING THAT WASN'T TRUE ?" |
| DEFENDANT — KNEW — MISREPRESENTATION | ASK YES—NO "DID HE KNOW IT WASN'T TRUE WHEN HE TOLD YOU?" |
| DETRIMENTAL — RELIANCE | RELIANCE — BY — PLAINTIFF AND LOSS — BY — PLAINTIFF |
| RELIANCE — BY — PLAINTIFF | ASK YES—NO "DID YOU DO ANYTHING DIFFERENTLY BECAUSE OF WHAT HE TOLD YOU ?" |
| LOSS — BY — PLAINTIFF | ASK YES—NO "DID YOU LOSE ANYTHING DUE TO THE MISREPRESENTATION ?" |

FIG. 4: TERMS 206 AND DESCS 205 USED TO DEFINE FRAUD

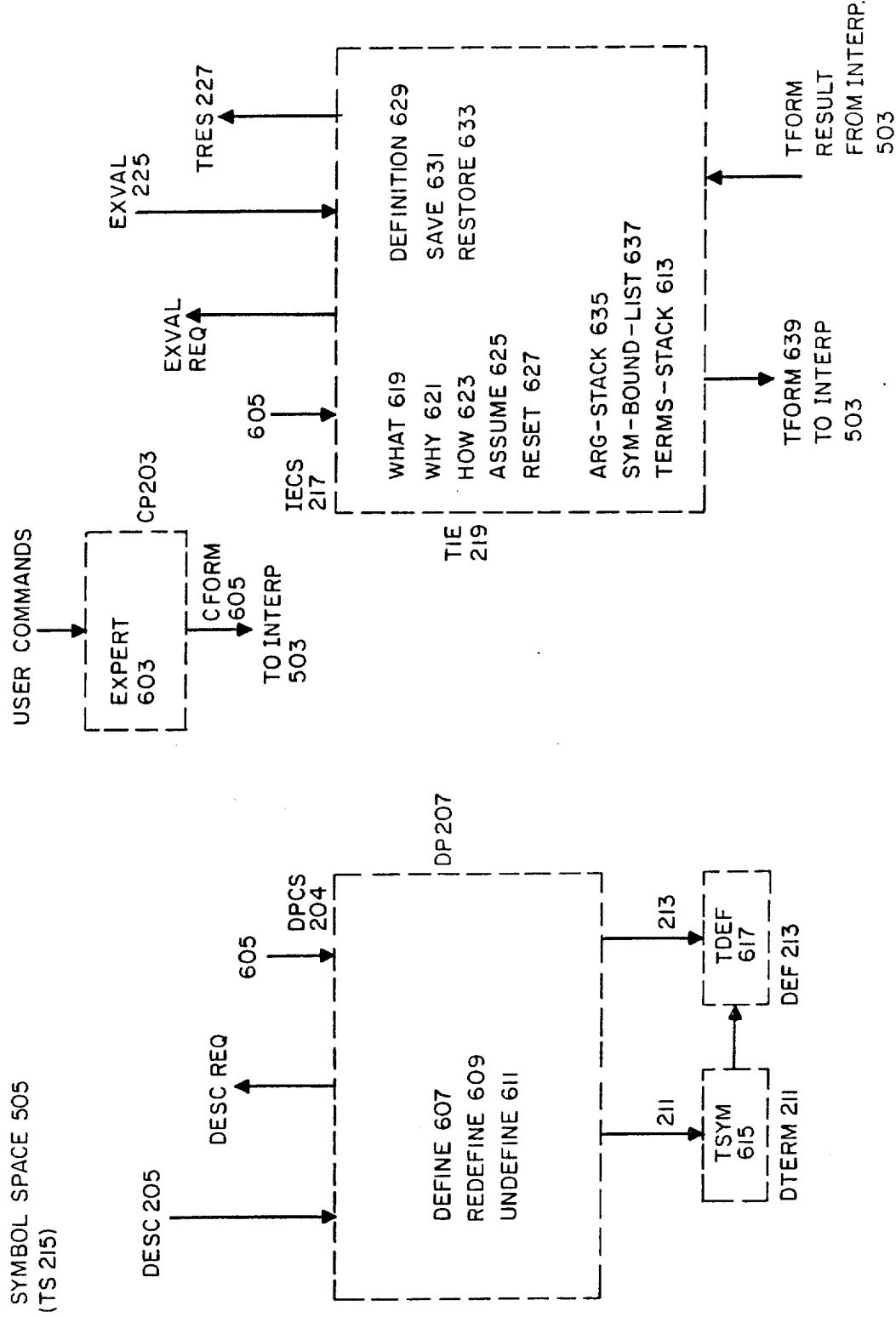
FIG. 6: OVERVIEW OF FIRST PROTOTYPE EMBODIMENT 601

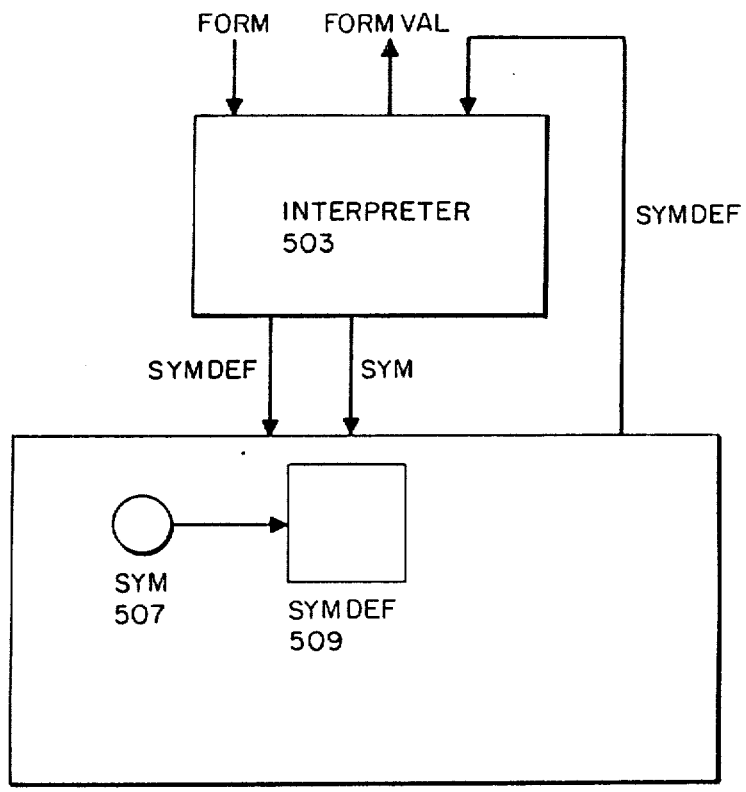
FIG. 5: LISP ENVIRONMENT 501
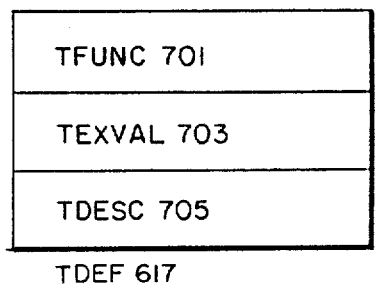
FIG. 7: DETAIL OF TDEF 617 OF FIRST PROTOTYPE

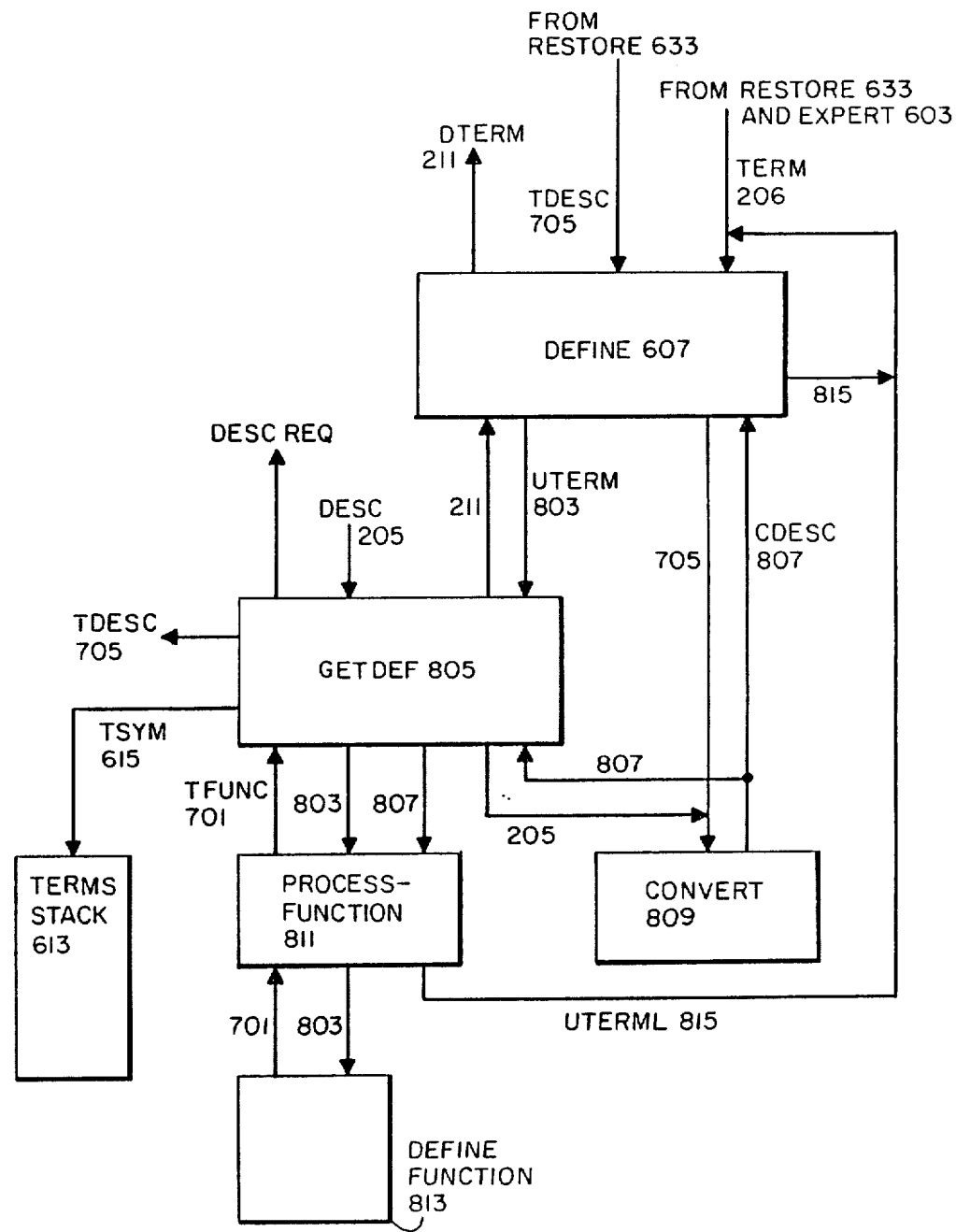
FIG. 8: DETAIL OF DEFINE 607

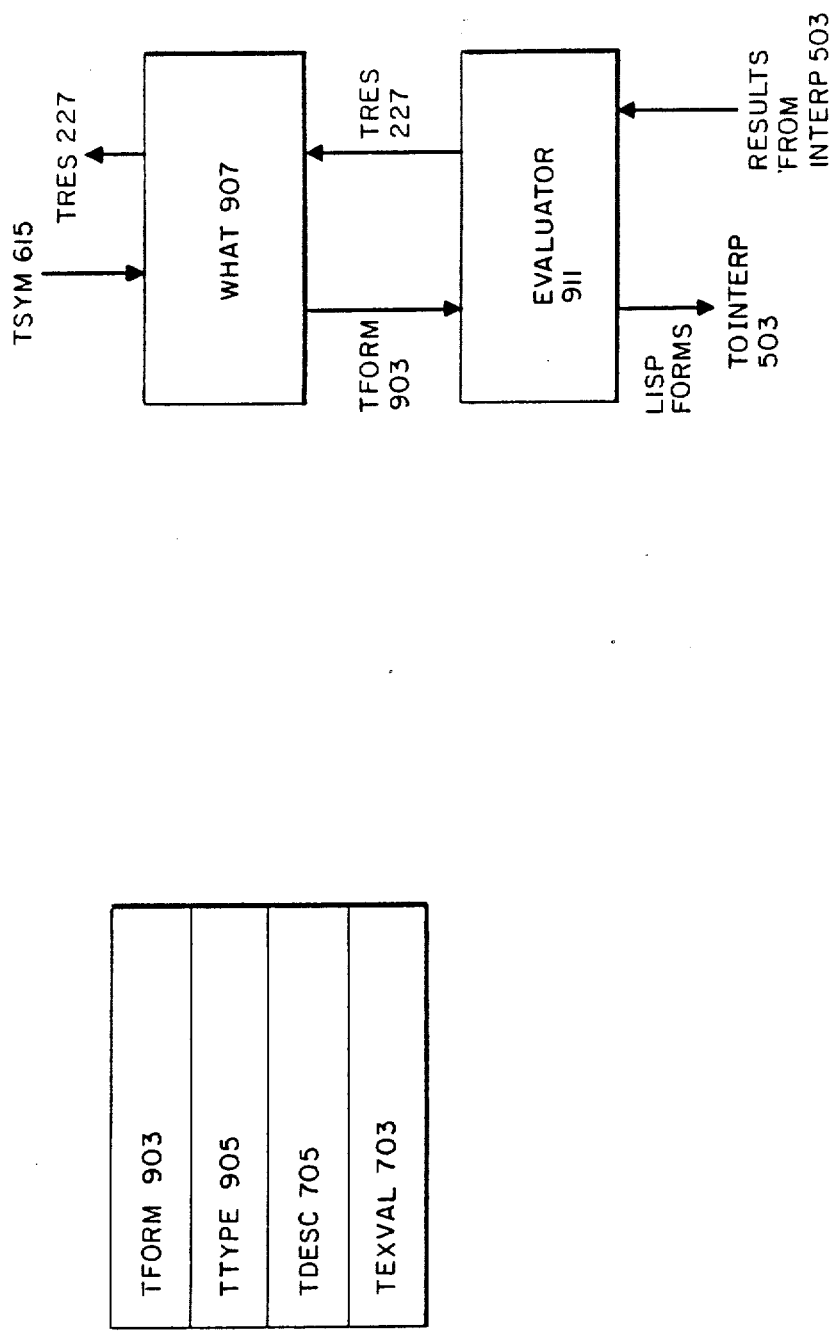
FIG. 9: TDEF AND WHAT IN A SECOND PROTOTYPE EMBODIMENT

EXPERT SYSTEM APPARATUS AND METHODS

CROSS-REFERENCES TO RELATED APPLICATIONS

This is a continuation of 07/766,860, filed 8/16/85 which is now abandoned.

BACKGROUND OF THE INVENTION

1. Field of the Invention

The present invention relates to expert systems implemented by means of digital computers and more particularly to the knowledge base and inference engine components of expert systems, to apparatus for creating expert systems, and to apparatus and methods for creating a definitional knowledge base.

2. Description of the Prior Art: FIGS. 1 and 1A

In recent years expert systems have become commercially available. An expert system is a system which applies information in a given field of expertise in the same fashion as would an expert in the field. Additionally, expert systems resemble human experts in that they are able to some degree to explain themselves. Depending on its complexity, an expert system may explain why it reached a given conclusion, explain why it wants a given piece of information, and permit the user to change the value of a given piece of information and see how that affects the result. Expert systems have been built which perform tasks such as configuring large computer systems, diagnosing bacterial infections, or diagnosing why an oil drilling bit has become stuck and suggesting a remedy.

Prior-art expert systems have generally been rule-based, i.e., they have functioned by applying rules obtained by questioning an expert about his expertise to facts provided by the user of the expert system. The rules are generally of the form If A then B In such a rule, A is termed the predicate for B, which is the conclusion. When A is true, then the conclusion may be inferred to be true. For example, one rule in a medical diagnostic system might be "If the patient has a fever and runny nose, he may have the flu." According to this rule, if the symptoms are a fever and runny nose, one possible inference is the flu.

FIG. 1 is a block diagram of a prior-art rule-based expert system 101. System 101 has three components, command processor (CP) 103, rule inference engine (RIE) 105, and rule store (RS) 107. RS 107 contains the rules 109 for the area for which the system is an expert. RIE 105 receives problem data from the user, applies the rules in RS 107 to the data, and provides the result of its application of the rules to the problem data to the user. CP 103 controls RIE 105 by means of inference engine commands (IEC). CP 103 produces the commands from command input provided by the user. To continue with the flu example above, a person using a medical diagnosis expert might input the command to the CP "What disease?" CP 103 would then provide an inference engine command to RIE 105, which would determine that its rules for diseases required symptoms. RIE 105 would then request problem data from the user, perhaps by asking "What symptoms?" The user could then input the symptoms and RIE 105 could then find a rule 109 for which the symptoms were the predicate and return the rule's conclusion as result data. For example, if the input symptoms were "fever and runny nose", expert system 101 could conclude from the rule 109 cited above that the disease might be the flu. Of course, many other ailments have those symptoms, and there would therefore be more than one rule 109 having the symptoms as part of its predicate. Depending on its sophistication, expert system 101 could simply return as results the conclusions of all rules 109 having the symptoms as part of their predicate or could ask the user for more symptoms and use the new symptoms to narrow the number of rules which would apply. in either case, expert system 101 can, at the request of the user, show what rules 109 it used to reach its conclusion.

The first prior-art expert systems 101 were custom-made and required long and close cooperation between an expert, a knowledge engineer, and computer system designers. The expert provided his expertise; the knowledge engineer reduced the expertise to rules 109 and designed RIE 105 and the representation used to store the rules 109 in RS 107. Computer system designers, finally, wrote the programs which implemented the knowledge engineer's design.

The large inputs of professional time required to custom build expert systems 101 made them very expensive and led the makers of expert systems 101 to develop special tools, called expert system shells, for making expert systems. FIG. 1A is a block diagram of an expert system shell 110 for making rule-based experts. As may be seen from that figure, the expert system shell has the components of the rule-based expert of FIG. 1 and an additional component, rule processor (RP) 111. Rule processor 111 is used to produce rules 109 for storage in a RS 107 specific to the expert system currently being built. RIE 105 is used in expert system shell 110 to test the expert system being built as it is constructed. When all of the rules 109 for the expert system being developed have been written and the system has been fully tested, users of the new expert system are given access to RIE 105 and to RS 107 for the new expert.

The usefulness of expert system shells 110 depends to a considerable extent on the sophistication of RP 111. In some systems, RP 111 requires rules 109 input in special forms. Thus, these systems generally require a knowledge engineer and cannot be used by the expert himself. In other systems, RP 111 constructs its rules from examples provided by the expert, and thus does not require a knowledge engineer.

Although rule-based expert systems 101 are becoming steadily more powerful, more usable, and less expensive, their reliance on rules has certain inherent disadvantages. First, most experts do not think about their areas of expertise in terms of a set of rules. Because they do not, a knowledge engineer or a system which constructs rules from examples must mediate between the expert and expert system shell 110. In the first case, the development of expert systems is more expensive than it would be otherwise, and in the second case, the complexity of expert system shell 110 is greater than it would be otherwise and the expert is still not completely insulated from the rules, since he must still check the rules produced by shell 110.

Second, since RS 107 is a collection of rules 109 created independently of each other, there is no guarantee that the collection of rules 109 is complete or contains no contradictory rules. If a set of rules 109 is incomplete, expert system 101 may reach no result or a wrong result; if the set of rules 109 includes contradictory rules 109, expert system 101 may again reach no result or reach a result which depends on RIE 105's internal algorithm for resolving contradictions rather than the rules.

The ability to operate with incomplete sets of rules 109 or with contradictory rules 109 is part of the power of rule-based systems 101 and is required in situations in which the expert is unable to reduce his area of expertise to clear principles. However, expert systems are employed in many situations where the expert can reduce his expertise to clear principles, and in these situations, the ability to deal with incomplete sets of rules 109 and contradictory rules 109 makes detection of mistakes more difficult, and when a mistake is made, makes the behavior of system 101 dependent upon RIE 105's internal algorithms rather than on the rules.

Third, rule-based expert systems 101 are difficult to modify. The behavior of rule-based expert system depends on the totality of its rules, and it is often difficult to determine what rules must be changed if the system's behavior is to be altered because it has bugs or because the expert has changed his mind about how he would deal with a given case.

Fourth, the power and complexity of rule-based expert systems 101 are not required for many situations in which expert systems are useful. Generally speaking, that power and complexity is required where the expert cannot fully define his expertise. However, there are many situations where the layman requires the guidance of an expert but the expert can completely and easily define his expertise. In such situations, useful expert systems and expert system shells need not have the complexity inherent in rule-based expert systems and expert system shells.

One such situation is that presented by complex forms such as tax forms. In most cases, little judgment is required to fill out the form, but the form is nevertheless so involved that many people require the help of a tax preparer. Spread sheets have made it mechanically easier to deal with the data involved in filling out a tax form and permit a user to see how a change in one value affects others, but they have not provided the kind of reasoned guidance for the user which is possible in an expert system. What is needed, therefore, and what is provided by the invention described herein, is an expert system shell which is easier to use than those typical of rule-based systems and expert systems which are substantially simpler than rule-based expert systems, but which provide reasoned expert advice in situations which do not require the full power of rule-based systems.

SUMMARY OF THE INVENTION

The present invention relates to digital data processing systems and more specifically to expert systems and expert system shells employed in digital data processing systems. Expert systems of the present invention employ definitions instead of rules. An expert defines his area of expertise as a set of terms with a corresponding set of hierarchical definitions. The definition for a term may include terms defined at a lower level of the hierarchy, literal terms, constant values, and values obtained from sources external to the expert system. The decisions which the expert would reach regarding a term in the hierarchy are expressed as values of the term. The defined terms make up the knowledge base of the expert system of the present invention. The inference engine determines what decision the expert would have made regarding a given term by computing the term's value from its definition. If the definition involves other terms, the values of those terms are computed from their definitions, and if the definition or the definitions of other terms involve values obtained from external sources, those values are obtained as needed to compute the value of the given term. If the external source is a terminal, the expert system asks the person at the terminal for a value and the person inputting the value may ask why the value is needed. The inference engine determines from the definition why the value is necessary and provides that information to the person inputting the value.

Once the inference engine has determined what decision the expert would have made, the user of the expert system may ask the expert system how it came to its conclusion. The inference engine again goes to the hierarchical definition of the term and works through the definition to show how it arrived at its result. Additionally, the user can ask the expert system to assume another value for one of the terms used in the definition of the term the user originally asked about. The inference engine then substitutes the new value for the old and determines anew what the result is for the term the user originally asked about, thus showing how the change in value of one of the subordinate terms affected the value of the term originally asked about.

The techniques used in the expert system of the present invention to determine why the expert system requested a given input, how the expert system arrived at a conclusion, and to change the value of a term and see the result are all applicable not only in the expert systems of the present invention, but also in other systems employing hierarchically-defined sets of terms.

Expert systems of the present invention are created using an expert shell of the present invention. The expert shell contains the inference engine and the definitional knowledge base just described and additionally contains a definition processor for creating the definitions in the definitional knowledge base. To use the definitional knowledge base, the user of the shell (generally the expert) inputs a define command followed by the term he wishes to define. The definition processor then requests a description of the term, and the expert describes the term. The description indicates how the term's value is to be derived and may contain other terms, constants, or a description of where an external value is to be obtained. If the description contains no further undefined terms, the definition processor creates the term's definition from the description. If the description contains further undefined terms, the definition processor requests a description of each of the undefined terms and processes the description as just described. The iterations continue until no undefined terms remain. As a term is defined, the term and its definition become part of the definitional knowledge base. The definition processor further permits the expert to redefine terms, remove a term and its definition from the knowledge base, and see the definition for a term and for the terms which enter into its definition. As may be seen from the above description, the expert system shell of the present invention permits an expert to provide information in the form of definitions instead of rules, ensures that a set of definitions is consistent, and makes it easy to determine what terms a given term depends on.

The technique employed in the definition processor of the present invention to create hierarchical definitions may be employed not only in expert system shells of the present invention, but also in any system which creates hierarchical systems of definitions.

It is thus an object of the invention to provide improved expert systems and expert system shells.

It is another object of the invention to provide an expert system having a definitional knowledge base and an inference engine which employs the definitional knowledge base to reach conclusions.

It is a further object of the invention to provide an expert system shell for producing expert systems having a definitional knowledge base.

It is an additional object of the invention to provide apparatus and methods for creating sets of terms having hierarchical definitions.

It is yet another object of the invention to provide apparatus and methods for indicating to a user of a knowledge base having hierarchical definitions how a conclusion was reached, why certain information was requested, and how the conclusion will change if one of the terms receives a different value.

It is a still further object of the invention to provide apparatus and methods which guarantee that an expert system knowledge base is complete and non-contradictory.

Other objects and advantages of the present invention will be understood by those of ordinary skill in the art after referring to the detailed description of a first prototype embodiment contained herein, to appendices containing the LISP code for the first prototype embodiment and a second prototype embodiment, and to the drawings, wherein:

BRIEF DESCRIPTION OF DRAWINGS

FIG. 1 is a conceptual block diagram of a prior-art expert system.

FIG. 1A is a conceptual block diagram of a prior-art expert system shell.

FIG. 2 is a conceptual block diagram of the expert system shell and expert system of the present invention.

FIG. 3 is a conceptual diagram of a hierarchy of definitions and used in the present invention.

FIG. 4 is a diagram of the terms and descriptions used to define the term FRAUD.

FIG. 5 is a diagram of a LISP environment.

FIG. 6 is an overview of a first prototype embodiment of the present invention.

FIG. 7 is a diagram of TDEF 617 of the first prototype embodiment.

FIG. 8 is a detailed diagram of the function DEFINE of the first prototype embodiment.

FIG. 9 is a diagram of certain improvements in the second prototype embodiment.

For ease of reference to figures, the reference numbers used in the description of the preferred embodiment have three digits. The two least-significant digits are reference numbers within a drawing; the most significant digit is the drawing number. For example, the reference number 901 refers to an item shown in FIG. 9.

DESCRIPTION OF A PREFERRED EMBODIMENT

The following description of a preferred embodiment first presents a conceptual overview of the expert system and expert system shell of the present invention and then presents a detailed description of a first prototype implementation of the invention. Certain improvements made in a second prototype implementation are discussed. A copy of the program for the first prototype is included in Appendix A and a copy of the program for the second prototype is included in Appendix B.

1. Conceptual Overview of the Expert System Shell and Expert System of the Present Invention: FIG. 2

FIG. 2 is a conceptual block diagram of expert system shell 201 and expert system 202 of the present invention. Expert system shell 201 has four components: command processor (CP) 203, definition processor (DP) 207, term store (TS) 215, and term inference engine (TIE) 219. Expert systems 202 produced using expert system shell 201 have all of these components but DP 207. As will be explained in more detail below, CP 203 receives commands from users of shell 201 and system 202 and provides them to the other components; DP 207 processes definitions; TS 215 stores defined terms and their definitions; TIE 219 uses a term's definition from TS 215 to evaluate the term and perform other operations on it.

CP 203 converts commands from users of shell 210 and expert systems 202 into definition processor commands (DPCs) 204 and inference engine commands (IECs) 217. In the prototype, DPCs 204 permit the user of shell 201 to define a term, redefine a term, undefine a defined term, view a term's definition, save a set of definitions, and restore a set of definitions. IECs 217 permit the user of shell 201 or an expert system 202 produced by shell 201 to determine the current value of a term, find out how expert system 202 reached that value, have expert system 202 assume a different value for a term and see how that affects the value of other terms, reset the value of any one or all of the terms, and when the determination of the current value of a term requires a value to be supplied from outside the definition, to ask expert system 202 why the value is required.

Definition processor 207 defines TERMs 204. When a TERM 206 has been fully defined, TS 215 contains a defined term (DTERM) 211 corresponding to TERM 206 and a definition (DEF) 213 for DTERM 211. TERM 206 may be received either in a DPC 204 or from a description (DESC) 205 DP 207 requested from the user of expert system shell 201 in response to a TERM 206. DP 207 first determines whether there is already a DTERM 211 corresponding to TERM 206, i.e., whether TERM 206 is already defined. If it is, DP 207 retrieves DTERM 211 corresponding to TERM 206 from TS 215 and prepares it for use in the definition DP 207 is currently constructing. If it is not defined, DP 207 outputs a description request (DESC REQ) to the user of shell 201. The user provides a description (DESC) 205 of TERM 206 to DP 201, which then makes a DEF 213 for TERM 206 using the information in DESC 205. As will be described in more detail below, DESC 205 is written in a definition language which permits the user to specify other TERMs 206, constant values, and that a value is to be obtained from outside expert system 206 for which the definition is being provided. The definition further specifies operations which may be performed on the values represented by TERM 206, constants, and external values in the definition. If DESC 205 contains TERMs 206, DP 207 treats those TERMs 206 in the manner just described. If there is a DTERM 211 corresponding to TERM 206, DTERM 211 is used in DEF 213 being constructed; if there is not, DP 207 requests a DESC 205 defining TERM 206 and processes it as just described. The repetitive operation of DP 207 is shown in FIG. 2 by arrow 208 showing how UDESC 210, which contains at least one TERM 206, is again processed by DP 207. Processing continues in this fashion until the original DESC 205 and all of the TERMs 206 in any DESCs 205 produced for TERMs 206 required to define the TERMs 206 in the original DESC 205 have been defined, i.e., have corresponding DTERMs 211 and DEFs 213 in TS 215.

The DTERMs 211 and DEFs 213 resulting from operation of DP 207 are placed in TS 215. DTERM 211 may be located in TS 215 by name. DEF 213 corresponding to DTERM 211 is associated with DTERM 211, and may thus be used once DTERM 211 is located. Included in DEF 213 is a modified version of DESC 205 from which DEF 213 is derived.

The remaining operations specified by DPCs 204 are carried out in DP 207 and TS 215 as follows: when a TERM 206 is undefined, DP 207 removes the corresponding DTERM 211 and DEF 213 from TS 215; when a TERM 206 is redefined, DP 207 removes DEF 213 corresponding to TERM 206 and requests a new DESC 205 for TERM 206. That DESC 205 is then processed in the manner just described. When a DPC requests that a TERM 206's definition be displayed, DP 207 displays the DESC 205 which was incorporated into the DEF 213 for DTERM 211 corresponding to TERM 206. Finally, the save operation saves the contents of a given TS 215 to a file for later use and the restore operation restores the contents of the file to TS 215.

Term inference engine (TIE) 219 performs operations using the DTERMs 211 and DEFs 213 in TS 215. The primary operation is the what operation, which determines the value of a DTERM 211 from its definition and external values provided by the user of expert system 202 or shell 201. TIE 219 performs the what operation in response to an IEC 217 specifying the operation and a TERM 206 from CP 203. TIE 219 uses DTERM 211 corresponding to TERM 206 to locate DTERM 211's DEF 213 in TS 215. It then performs the operations specified in DEF 213 using the DTERMs 211, constants and external values specified in the definition and returns the result, TRES 227, to the user of system 202 or shell 201.

The constants in DEF 213 are available for immediate use in calculating the value of DTERM 211; in the case of the external values, DTERM 211 contains a description of how the external value is to be obtained. TIE 219 uses the description to make a request for an external value (EXVAL REQ) to the source of the external value (EXVAL) 225 and receives EXVAL 225 from the source. In the simplest case, the source is the terminal being used by the user of system 202 or shell 201 and the information is obtained by putting a question on the user's terminal screen and receiving his input; in more complex cases, the source may be a file or a data base.

In the case of a further DTERM 211 in DEF 213 for the DTERM 211 being evaluated. TIE 219 obtains the further DTERM 211's DEF 213 and computes that DTERM 211's value from its DEF 213, evaluating as it does so any DTERMs 211 in that DEF 213, and continuing thus until all DTERMs 211 from which the DTERM 211 whose value is being sought in the what operation is dependent have been evaluated. The constants, external values, and DTERMs 211 specified in each DEF 213 are dealt with in the manner just described. When all DEFs 213 have been evaluated, the value of DTERM 211 whose value is being sought is computed and returned as TRES 227.

In a preferred embodiment, EXVALs 225 which are obtained during evaluation of a given DEF 213 become part of that DEF 213's definition; thus, if the what operation is performed a second time on DTERM 211, TIE 219 will not produce any EXVAL REQs, but will simply use the stored EXVALs 225 to recompute the value of DTERM 211. A preferred embodiment has two IECs 217 for modifying the stored EXVALs 225. The first, reset, simply removes all of the stored EXVALs 225 from the DEFs 213 for the DTERMs 211 specified in the reset command. Thus, when what is again performed, a new EXVAL 225 will be obtained as previously explained. The second, assume, permits a new EXVAL 225 to be provided to DEF 213 for TERM 206 specified in the assume command. When what is again performed in this case, the specified EXVAL 225 is used to derive the value of DTERM 211 for which the what operation is being performed.

If a user of shell 201 or system 202 wants to know why TIE 219 is asking for a given EXVAL 225, he can respond to an EXVAL REQ with the command for the why operation. In response to that command, TIE 219 outputs DESC 205 from DEF 213 for the DTERM 211 whose value was being computed when the EXVAL 225 was required, and the user can determine from DESC 205 why the given EXVAL 225 is important. The user can further use why to ask why any of the DTERMs 211 whose values are required to obtain the value of the DTERM 211 whose evaluation produced the EXVAL REQ are required, and TIE 219 provides the DESCs 205 for those DTERMs 211.

3. The Hierarchy of Definitions: FIG. 3

In defining any term, DP 207 produces a hierarchy of DEFs 213. If DEF 213 for the term being defined itself contains no terms, the hierarchy has only one level. If DEF 213 for the term contains a further term, that term must be defined before the first term can be defined, and the first term is the top term in a hierarchy with two levels. If any of the DEFs 213 at the second level contains a further term, that term must be defined, and the hierarchy has three levels. The hierarchy thus continues to deepen until none of the DEFs 213 for the terms upon which other terms depend contains a further term, but is instead defined solely in terms of operations on constants or external values. As is clear from the above discussion, a DEF 213 is always the top DEF 213 in the hierarchy of DEFs 213 required to define the DTERM 211 which DEF 213 defines, but may at the same time be at a lower level in the hierarchy of DEFs 213 required to define some other DTERM 211.

FIG. 3 is a conceptual illustration of one such hierarchy of DEFs 213. Hierarchy 305 contains DEFs 213(A) through 213(E) corresponding to DTERMS 211(A) through 211(E) belonging to set of DTERMS 301. The topmost definition in hierarchy 305 is DEF 213(A), corresponding to DTERM 211(A). The notation OP(B,C) in DEF 213(A) indicates that DEF 213(A) specifies that the value of DTERM 211(A) is obtained by performing an operation on the values of DTERMs 211 (B) and (C). Similarly, DEF 213 B specifies that the value of DTERM 211(B) is obtained by performing an operation on the values of DTERMs 211(D) and (E). Consequently, hierarchy 305 for DEF 213(A) has three levels: level 1 307, containing only DEF 213(A), level 2 309, containing DEF 213(B) and DEF 213(C), and level 3 311, containing DEFs 213(D) and 213(E). DEFs 213(C), 213(D), and 213(E) do not define DTERMs 211 C, D, and E with other DTERMs 211, and cannot give rise to lower levels. Such DEFs 213 are termed terminal definitions 312.

In constructing hierarchy 305, DP 207 begins with TERM 206(A) corresponding to DTERM 211(A), which it receives from a DESC 205 from which a DEF 213 at a higher level is being constructed or from a define or redefine DPC 204. DP 207 then requests a DESC 205 for DTERM 211(A). DESC 205 defines DTERM 211(A) in terms of an operation on two TERMS 206, B and C. If DEF 213(B) and DEF 213(C) already exist, DP 207 can make DEF 213(A) and need go no further. If either DEF 213(B) or DEF 213(C) does not exist, DP 207 must produce those DEFs 213 before it can make DEF 213A. DP 207 thus asks for a DESC 205 for TERM 206(B) and for TERM 206(C). In the case of TERM 206(C), DESC 205 defines TERM 206(C) only in terms of EXVAL(C) 225, and DEF 213(C) can be constructed immediately. In the case of TERM 206(B), DESC 205 defines TERM 206(B) in terms of two additional TERMs 206, D and E; consequently, DP 207 must descend another level and produce DEFs 213 for those TERMs 206. Again, DP 207 requests DESCs 206 for those terms. In both cases, the TERMs 206 are defined in terms of EXVALs 225, and consequently, both DEFs 213 can be constructed. DEFs 213 for all TERMs 206 involved in the definition of TERM 206 A have now been constructed, DTERMs 211(B) through (E) corresponding to TERMs 206 (B) through (E) exist, DEF 213(A) can be constructed, and TERM 206(A) now has a DTERM 211(A) corresponding to it.

Because hierarchy 305 is constructed repetitively beginning with the top DEF 213 in hierarchy 305 and only TERMs 206 which have no corresponding DTERM 211 are defined, no DTERM 211 can have two DEFs 213 and no DEF 213 in hierarchy 305 can refer to a DEF 213 which is above it in hierarchy 305. Consequently, the DEFs 213 in hierarchy 305 are necessarily complete and consistent with regard to DEF 213(A) in hierarchy 305 or to the top DEF 213 in any hierarchy incorporating DEF 213(A).

4. The Description Language for Descriptions 205

As previously indicated, DP 207 makes DEFs 213 from descriptions (DESCs) 205. In the prototype, DESCs 205 are made using a description language. The description language includes predefined terms specifying operations on terms, a case statement, and operations for obtaining external values.

The operations include Boolean operations, arithmetic operations, and text concatenation. The case statement is a list of boolean expression-value pairs of the form:

(boolean_exp_1) value$_{i3}$1 . . . (boolean_exp_n) value_n
(OTHERWISE) otherwise_value When DEF 213 containing a case statement is evaluated, the boolean expressions 1 through n are evaluated in order until one of them is true. The value corresponding to the true boolean expression becomes the value of DTERM 211 defined by DEF 213. If none of the boolean expressions is true, the value corresponding to OTHERWISE becomes the value of DTERM 211.

The description language of the prototype permits specification of two classes of operations for obtaining external values. The first class, the ASK operations, obtains values from the terminal of the user of expert system 202. The first class, the ASK operations, are used to obtain external values from the terminal. The second class, the RECORD operations, are used to obtain external values from a data base system. In both cases, the external values may be numbers, text strings, or boolean values, or they may select one of a set of alternative literal terms, i.e., terms which represent nothing but themselves.

ASK to obtain a numeric value has the form:

ASK NUMBER "prompt_string"

When the DEF 213 containing such an ASK operation is evaluated, DP 207 outputs the prompt string to the terminal and waits for a number input from the terminal. That number is then used in the evaluation of DEF 213. The prompt string may itself contain a previously-defined term, and consequently, a user's response may be made to depend on the value of a previously-evaluated term. The ASK operations for boolean and text string values are specified in the same fashion as the ASK operation for numeric values, except that NUMBER in the above operation is replaced by YES-NO when a boolean value is sought and TEXT when a text string is sought.

ASK which selects one of a number of literal terms has the form:
ASK CHOICE "prompt_string"
(literal_term_1 . . . literal_term_n)

When the DEF 213 containing ASK CHOICE is evaluated, the prompt string is output and the user is asked to select one of the literal terms. That literal term may then be used in DEF 213 to compute the value of DTERM 211 defined by DEF 213.

The RECORD operations are generally analogous to the ASK operations, except that the RECORD operation specifies how the external value is to be located in the data base and the data base supplies the value at the specified location.

5. Operation of Shell 201 and System 202: FIG. 4

The operation of shell 201 will be explained in detail using a hierarchy of definitions from which it may be determined whether someone has been defrauded. The legal definition of fraud requires that one party knowingly made a misrepresentation to the other party and that the other party relied on the misrepresentation to his detriment. FIG. 4 shows a hierarchy of DTERMs 211 which corresponds to that legal definition.

Creation of the hierarchy of FIG. 4 begins when CP 203 receives the DEFINE FRAUD command. CP 203 then passes TERM 206 FRAUD to DP 207, which requests a DESC 206 from the expert making the definition. The expert provides the DESC 206

KNOWING_MISREPRESENTATION AND DETRIMENTAL_RELIANCE

This DESC 206 contains two further TERMs 206 and the boolean AND operator. Thus, the value of FRAUD is to be computed by obtaining the values of the DTERMs 211 corresponding to the TERMs 206 and performing an AND operation on them.

Since the further TERMS 206 are undefined, DP 207 asks for their definitions. The expert provides the DESC 205

MISREPRESENTATION AND DEFENDANT_KNEW_MISREPRESENTATION FOR KNOWING_MISREPRESENTATION and the DESC 205 RELIANCE_BY PLAINTIFF AND LOSS[3]BY_PLAINTIFF for DETRIMENTAL_RELIANCE. Again, these further TERMs 206 are undefined, so DP 207 asks for their definitions and the expert provides the definitions shown in FIG. 4. While DP 207 may ask for definitions in any order, a preferred embodiment defines all TERMs 206 necessary to define a given undefined TERM 206 before going on to the next undefined TERM 206.

In the above example, the DESCs 205 for MISREPRESENTATION, DEFENDANT_KNEW_MISREPRESENTATION, RELIANCE_BY_PLAINTIFF, and LOSS BY_PLAINTIFF all contain only the system-defined DTERMs 211 used in the ASK YES-NO operation, so DP 207 is now able to produce DEFs 213 for all of the terms in the hierarchy. The values of all of the DTERMs 211 in the hierarchy depend ultimately on the values which the ASK YES-NO operation requests from the user of expert system 202 which employs the FRAUD definition, and thus depends ultimately on what the plaintiff says about what happened to him.

Use of the FRAUD definition hierarchy in expert system 202 begins with the WHAT FRAUD command which the user of expert system 202 inputs to CP 203. CP 203 generates a corresponding WHAT FRAUD IEC 217 for TIE 219. TIE 219 then determines the value of FRAUD by evaluating its DEF 213. In order to do that, it must evaluate the DEFs 213 for other DTERMs 211 in the hierarchy, beginning with KNOWING_MISREPRESENTATION. The evaluation of KNOWING MISREPRESENTATION requires the evaluation of MISREPRESENTATION. The evaluation of that DTERM 211 results in the execution of the WHAT YES-NO operation in its DEF 213, and TIE 219 outputs the prompt "Did he tell you anything that wasn't true?" If the user answers "no", MISREPRESENTATION is false, KNOWING MISREPRESENTATION is false, and FRAUD is false, so TIE 219 returns TRES 227 to the user indicating that there is no fraud. If the user answers "yes", TIE 219 evaluates DEFENDANT_KNEW_MISREPRESENTATION, which again results in a question to the user. Depending on the answer to the question, evaluation continues or is finished. TIE 219 proceeds in the above fashion until it has computed a value for FRAUD.

As previously mentioned, a user of expert system 202 may use the HOW user command to determine how expert system 202 arrived at its value for FRAUD. Assuming that the user answered "no" when asked "Did he tell you anything that wasn't true" (in the definition of MISREPRESENTATION), TIE 219 in the prototype will respond to HOW FRAUD by outputting FRAUD is defined to be (KNOWING_MISREPRESENTATION AND DETRIMENTAL_RELIANCE) where (KNOWING MISREPRESENTATION) equals FALSE.

As previously mentioned, DP 207 places DESC 205 for a DTERM 211 in the DTERM 211's DEF 213, and TIE 219 also stores the external values it receives in evaluating a DTERM 211's DEF 213 in DEF 213. In performing the HOW operation, TIE 219 first fetches and outputs DESC 205 from DEF 213 for the DTERM 211 being inquired about and then evaluates the DTERMS 211 in DEF 213 as required to obtain the value of DTERM 211 being inquired about. The DTERMs 211 are then output together with their values. If a user wishes to inquire further, he need only repeat the HOW operation on the other DTERMS 211 specified in the DESC 205 output in the HOW operation.

As also previously mentioned, a user may respond to a request for an external value with the WHY command instead of a value. If a user responds in the case of the FRAUD example with WHY when TIE 219 asks "Did he tell you anything that wasn't true", TIE 219 responds with:

MISREPRESENTATION is needed to determine the value of KNOWING_MISREPRESENTATION, which is defined to be MISREPRESENTATION AND SUBJECT_KNEW_MISREPRESENTATION and repeats the question.

Again, the information used to respond to the WHY command comes from the DESCs 205 stored in the DEFs 213 in the hierarchy used to define FRAUD. If the user wants to know more at this point, he can apply HOW to the DTERMs 211 mentioned in the response to the WHY command.

6. The LISP Environment of the Prototype Embodiments: FIG. 5

Having thus provided a conceptual overview of the structure and operation of shell 201 and system 202, the discussion proceeds to a detailed description of the implementation of the first prototype.

Both the first and second prototype embodiments are implemented in the LISP programming language and execute in the LISP environment. The LISP programming language and environment are frequently used to implement prototype and production expert systems and are well-known in the expert system art. The specific LISP dialect used for the prototype embodiments is COMMON LISP, which is described in Guy L. Steele, J., *COMMON LISP, the Language*, Digital Press, 1984. Only so much of the LISP environment and language are described here as is required for a clear understanding of the mode of operation of the prototype embodiments.

Beginning with the LISP language, the language differs from languages such as FORTRAN or PASCAL in that is is chiefly concerned with the processing of symbols, as opposed to the processing of data which is represented in a program by symbols. The fundamental components of a LISP program are atoms. An atom may be a symbol, such as ABC, or a constant. The components are organized into programs by means of lists which may have no members or members including atoms and other lists. A list is made by enclosing its members in parentheses: (ABC) is a list with one member, the symbol ABC. Functions appear in LISP as lists in which the first symbol in the list represents the function and the other atoms represent the function's arguments. For example, the add function is represented in LISP by the symbol +, and the list (+2 3) specifies that the + operation is to be applied to the atoms 2 and 3. Any atom or list which has a value when evaluated by a LISP interpreter is called a form. 5 and (+2 3) are forms, and if the symbol ABC has a value, it is a form.

Functions are defined in LISP by means of the DEFUN function, in which the remaining items of the list define the function's name, its arguments, and the value it returns. For example, (defun five () 5) defines a function which takes no arguments and always returns the value 5.

Among the things LISP programs can do with symbols and lists is make them. Since a function definition is only a kind of list, a LISP program can provide a symbol to DEFUN as the name of the new symbol being created by DEFUN and then use the symbol to execute the newly-created function. Symbols may either represent themselves as symbols or values. When a symbol is representing itself as a symbol in a LISP list, it is preceded by a ' mark. In the case of symbols representing function, the value of the symbol is the function. However, if the function is placed in a list with its arguments and the list evaluated, the result is the value of that execution of the function. Thus, 'five represents the symbol five, while five represents the function defined by DEFUN above, and (five) represents the value of an execution of the function five, i.e., 5.

LISP programs are written and executed in a LISP environment. That used for the prototype embodiments was made by Gold Hill Computers, Inc. for the Professional Computer manufactured by Wang Laboratories, Inc. FIG. 5 is a conceptual block diagram of a typical LISP environment 501. Environment 501 has two main components, LISP interpreter 503, which evaluates LISP forms, and LISP symbol space 505, which stores LISP symbols (SYM 501) and their definitions (SYMDEF 509). DEFUN and certain other LISP functions create and define new LISP symbols or redefine previously-existing LISP symbols when they are evaluated; consequently, LISP interpreter 503 may be seen as not only an evaluator of symbols, but also as a creator, definer, and redefiner of symbols.

Operation of LISP environment 501 is as follows: when a user of LISP environment 501 types a list containing a form such as (five), LISP interpreter 503 evaluates the form by locating the symbol five in symbol space 505, determining what its SYMDEF 509 is, and then interpreting SYMDEF 509 to compute the value of five. In this case, SYMDEF 509 is the code for the function five which was created by evaluation of the DEFUN expression, and its interpretation produces the value 5, which the interpreter returns to the user as the value of (five).

Because LISP interpreter 503 is able to create SYMs 507 and their corresponding SYMDEFs 509, store them in symbol space 505, and locate them in symbol space 505, LISP environment 501 automatically performs operations which are difficult to implement in other languages and which are essential for the operation of expert system shells and expert systems. For that reason, LISP environments 501 have been the preferred environments for the creation of prototype expert systems and expert system shells. As will be seen in the ensuing discussion, the prototypes of the present invention take full advantage of the symbol creation, definition, and location operations.

7. Overview of the First Prototype Embodiment: FIG. 6

In the first prototype embodiment, the components of expert shell 201 and expert system 202 are implemented by means of LISP functions. Code for these functions is contained in Appendix 1. FIG. 6 gives an overview of that code and relates the LISP functions of the first prototype embodiment to the components of FIG. 2 and the inputs and outputs of those components. Thus, the LISP functions making up CP 203 are contained in the dashed box with that label, the functions making up DP 207 are in the dashed box with that label, and those making up TIE 219 are in the dashed box with that label. TS 215 is embodied in the first prototype by LISP symbol space 505, which stores LISP symbols and their definitions. The components of the first prototype embodiment should also be understood to include LISP interpreter 503, which executes the LISP functions making up the components, places the SYMs 507 and SYMDEFs 509 created by the components in symbol space 505, and manipulates the SYMs 507 and their SYMDEFs 509.

Beginning with EXPERT 603, EXPERT 603 performs the functions of CP 203 in the prototype. Code for expert 603 may be found on page 14 of Appendix 1. As can be seen from that code, EXPERT 603 receives an input string, puts parentheses around it to produce a LISP form termed CFORM 605 in FIG. 6, and performs the EVAL operation on it. When LISP interpreter 503 evaluates the form, it treats the first symbol in the form as a LISP function name and the remaining items in the form as a list of arguments for the named function. Expected input strings for EXPERT 603 are the commands for DP 207, namely DEFINE, REDEFINE, UNDEFINE, and the commands for TIE 219, namely WHAT, HOW, ASSUME, RESET, DEFINITION, SAVE, WHY, and RESTORE. DEFINE, REDEFINE, and UNDEFINE correspond to the DPCs 204 of FIG. 2 and the remaining strings correspnd to the IECs 217 of that figure. In the first prototype embodiment, there is no error detection in EXPERT 603; however, in a commercial embodiment, EXPERT 603 would include code for detecting and responding to improper input.

As may be seen from FIG. 6, DP 207 is embodied in the first prototype by the LISP functions DEFINE, on page 1 of Appendix 1, REDEFINE, and UNDEFINE, both on page 3. When EXPERT 603 receives the DEFINE command with a TERM 206 such as FRAUD, and presents it to the LISP interpreter as (DEFINE FRAUD), LISP interpreter 503 invokes the function DEFINE with the argument FRAUD. DEFINE requests a DESC 205 from the user and uses DESC 205 to produce the DEF 213 for FRAUD. As will be explained in greater detail below, the result of the invocation is a LISP function named FRAUD for which the DEFUN would look like the following:

```
(defun FRAUD ( )
 (prog2
  (push 'FRAUD arg-stack)
  (AND (KNOWING_MISREPRESENTATION)
   (DETRIMENTAL_RELIANCE))
  (pop Arg-stack)
  ))))
```

In the course of defining FRAUD, KNOWING_MISREPRESENTATION and DETRIMENTAL_RELIANCE and the DETERMs 211 required for their definitions are all defined as LISP symmbols representing LISP functions. AND is a predefined LISP function which performs the AND operation on its arguments. The value returned by the function FRAUD is the result of the AND operation.

The DTERMs 211 which have been defined as LISP symbols representing LISP functions are termed TSYMs 615 in the following discussion, and their definitions, which are the prototype's implementation of DEFs 213, are termed TDEFs 617. As the LISP interpreter produces TSYMs 615 and TDEFs 617 in response to the DEFINE function, it places them in symbol space 505. TDEF 617 in the first prototype is shown in FIG. 7. As shown there, each TDEF 617 contains TFUNC 701, the LISP function represented by TSYM 615, TDESC 705, a modified copy of DESC 205 which was the source of TSYM 615's definition, and TEXVAL 703, which contains the last EXVAL 703 specified by a user of expert 202 for TSYM 615.

The remaining functions in DP 207 are invoked in the same fashion as DEFINE from EXPERT 603. REDEFINE first employs LISP operations which remove TFUNC 701 and TDESC 705 from TDEF 617 for TSYM 615 being redefined and then invokes DEFINE to make new values for TFUNC 701 and TDESC 705 in TDEF 617. UNDEFINE simply removes TFUNC 701 and TDESC 705 without making a new definition of TSYM 615.

Continuing with the implementation of TIE 219 in first prototype embodiment 601, when LISP interpreter 503 receives a CFORM 605 from EXPERT 603 which represents an IEC 217, it executes the function in TIE 219 specified in CFORM 605. As the functions in TIE 219 are executed, they provide forms (TFORMS 639) made from TSYMS 615 to Interpreter 505, which evaluates them and returns the results (TFORM RESULT) to the function being executed.

The functions in TIE 219 employ data structures in TIE 219, ARG-STACK 635 and TERMS-STACK 613, defined on page 1 of appendix 1, and SYM-BOUND-LIST, defined on page 12. Beginning with ARG-STACK 635, ARG-STACK 635 is used to store a TSYM 615 while the values of the TSYMs 615 with which it is defined are computed. As may be seen in the code for the procedure FRAUD above, the symbol FRAUD is pushed to ARG-STACK before the AND operation which defines FRAUD is executed and is popped from ARG-STACK thereafter. TERMS-STACK 613 is a stack of TSYMs 615. The stack is ordered by when a TSYM 615's TDEF 617 was created, with the first TSYM 615 to have its TDEF 617 created at the bottom and the last at the top. As will be explained in detail below, the last TSYM 615 is normally the one whose TDEF 617 is at the top of the hierarchy of definitions. SYM_BOUND_LIST 637 is a list of TSYMs 615 which currently have EXVALs 225 assigned to them.

Beginning the discussion of the LISP functions in TIE 219 with WHAT function 619, that function is executed in response to the WHAT command to EXPERT 603. That command has the form WHAT DTERM 611. For FRAUD, it would be WHAT FRAUD, which EXPERT 603 turns into (WHAT FRAUD). WHAT function 619 on page 5 of Appendix 1 first uses a LISP function to determine whether its argument is a TSYM 615, and if it is, uses another LISP function which takes a symbol which is a function name as an argument and invokes the function, in this case, FRAUD. The result is the execution of TFUNC 701 in TDEF 617 for FRAUD. When that TFUNC 701 is executed, the TFUNCs 701 for MISREPRESENTATION and DETRIMENTAL_RELIANCE are executed until the value of FRAUD has been determined. When a TFUNC 701 for a given TSYM 615 is executed, the TFUNCs 701 for any TSYMs 615 required to find the value of the given TSYM 615 are executed. When all of the necessary TFUNCs 701 have been executed, the value resulting from those executions is returned to the user of system 202 as TRES 227. If a TSYM 615 whose TFUNC 701 requires an EXVAL 225 already has such a value, the TSYM 615 is on SYM-BOUND-LIST 637 and TFUNC 701 uses TEXVAL 703 in TDEF 617 for TSYM 615; otherwise, TFUNC 701 generates an EXVAL REQ and obtains EXVAL 225 from the user. Thus, the WHAT function, together with LISP interpreter 503, operate as an inference engine for determining the value of the TSYM 615 whose definition is at the top level of the heirarchy as determined by external values. Further, as long as a TFUNC 701 invoked as a consequence of the WHAT operation is active, its corresponding TSYM 615 is on ARG-STACK 635.

HOW function 623, on page 4 of Appendix 1, is executed in response to the HOW command, which specifies a TSYM 615. HOW function 623 takes that TSYM 615 as an argument and uses another LISP function, SYMBOL-FUNCTION with the argument TSYM 615 to obtain the list used with DEFUN to define TFUNC 701 corresponding to TSYM 615 and other LISP functions to obtain the third element in the third list in TFUNC 701. As may be seen from the FRAUD function above, that element is the list defining the operation by which the function's value is derived, i.e., in FRAUD, the list (AND (KNOWING MISREPRESENTATION) (DETRIMENTAL_RELIANCE)). The HOW function retrieves that list, uses TIE 219's DEFINITION function to display TDESC 705 for TSYM 615 used in the HOW command, and then evaluates the TSYMs 615 in the list retrieved from TFUNC 701, and outputs the results with suitable explanatory text.

The user of expert 202 may input the WHY command either to EXPERT 603 or to TIE 219 in response to an EXVAL REQ output during evaluation of a TSYM 615. The WHY function is on page 1-4 of Appendix 1. The function may be invoked either with or without a TSYM 615 as an argument. In the first case, the function works with the TSYM 615 currently at the top of ARG-STACK 635, which is the TSYM 615 corresponding to TFUNC 701 currently being evaluated and whose evaluation produced the EXVAL REQ to which the user may be responding, and in the second case, it works with TSYM 615 provided by the user. In either case, the next step is to locate the preceding TSYM 615 in ARG-STACK 635, which is the TSYM 615 corresponding to the TFUNC 701 whose evaluation led to the evaluation of the function corresponding to TSYM 615 being processed by WHY. If there is no preceding TSYM 615, the WHY command is meaningless, and a corresponding message is output to the user; if there is a preceding TSYM 615, then DEFINITION is used to output the definition for the preceding TSYM 615 together with suitable explanatory text.

Continuing with the DEFINITION function, whose code is on page 5 of Appendix 1, the command to EXPERT 603 which invokes the function may have either a TSYM 615 as an argument or no argument. In the first case, TDESC 705 in TDEF 617 is output; in the second case, the TDESCs 705 for all TSYMs 615 on TERMS-STACK 613 are output.

The ASSUME function, whose code is on page 9 of Appendix 1 is invoked with the ASSUME command, which specifies a TSYM 615 and a value. The TSYM 615 must be one whose TFUNC 701 requests an EXVAL 225. ASSUME first empties ARG-STACK 635, so that the TSYM 615 will be reevaluated before a WHY command succeeds, then sets TEXVAL 703 in TDEF 617 to the value received as an aargument, and puts TSYM 615 on SYM-BOUND-LIST 613 to indicate that it has a TEXVAL 703.

The RESET function, whose code is on page 13 of Appendix 1, is invoked with the RESET command, which may or may not specify a TSYM 615. In the first case, only TEXVAL 703 in TDEF 617 corresponding to TSYM 615 is reset; in the second case, all TEXVALs 703 are reset. The RESET function first empties ARG-STACK 635 for the reasons previously described. If a TSYM 615 is specified, the RESET function unbinds TEXVAL 703 from TSYM 615, effectively removing it from TDEF 617, and removes TSYM 615 from SYM-BOUND-LIST 637. If no TSYM 615 is specified, RESET performs the above operation for every TSYM 615 on SYM-BOUND-LIST 637. The SAVE function, whose code is on page 5, makes a file which contains a DEFINE command for each TSYM 615 followed by TDESC 705 for the TSYM 615. The DEFINE commands occur in the order in which TSYMs 615 occur in TERMS-STACK 613. SAVE works by outputting the following to the file for each TSYM 615 in TERMS-STACK 613: the string DEFINE, a string representing TSYM 615, and a string representing TDESC 705 for TSYM 615. The resulting file contains the TDESCs 705 in the order in which the DESCs 205 upon which they are based were input to DP 207.

The RESTORE function, whose code is also on page 5, restores the TSYMS 7615 which were previously saved. It does so by performing a LISP load operation on the file. In the load operation, the LISP symbols in the file are evaluated. In this case, the result of the evaluation is the production of the TSYMs 615 and their TDEFs 617 specified in the DEFINE commands in the resored file.

10. Detailed Description of DEFINE 607: FIG. 8

FIG. 8 shows how the DEFINE functions and functions invoked by it recursively create the hierarchy of TDEFs 617 for a given set of TSYMs 615. As previously mentioned, the manner in in which DEFINE creates the hierarchy of TDEFs 617 guarantees that each TERM 206 is completely defined and that a given TERM 206 has only a single definition.

FIG. 8 shows DEFINE, the major functions invoked by DEFINE, and the manner in which the data from which TSYMs 615 AND TDEFs 617 are created flows between the functions.

DEFINE 607 (page 1 of Appendix 1) produces DTERMs 211 from TERMs 206. When DEFINE returns DYTERM 211, TSYM 615 and TDEF 617 corresponding the DTERM 211 have been created. DEFINE 607 is invoked by EXPERT 603 and RESTORE 633; additionally, it is recursively invoked by itself and by PROCESS-FUNCTION 811. EXPERT 603 provides CFORM 605 containing the DEFINE symbol and TERM 206 to be defined; RESTORE 633 provides a CFORM 605 containing the DEFINE symbol and a TERM 206 which is a copy of a previously-saved DTERM 211 and a copy of TDESC 705 for the DTERM 211. When DEFINE 607 is recursively invoked, its input is a TERM 206 which is is used in the DESC 205 of another TERM 206 being defined.

Generally speaking, TERM 206 is a single symbol; however, when DESC 205 includes a case statement, TERM 206 may be a list; in that case, DEFINE invokes CONVERT 809 to convert the list to a LISP form and then recursively invokes itself to define each of thhe undefined TERMs 206 in the LISP form. Next, DEFINE 607 determines whether TERM 206 is a LISP symbol; if it is not, DEFINE 607 simply returns TERM 206 unchanged. If it is, DEFINE 607 determines whether TERM 206 was provided by RESTORE 633; if it was, DEFINE 607 provides TERM 206 and the copy of TDESC 705 to GETDEF 805 and returns the value returned by GETDEF 805, namely a list whose element is TERM 206. If TERM 206 was not provided by RESTORE 603, DEFINE 607 determines whether there is already a TSYM 615 for TERM 206 or if TRM 206 is a literal (i.e., there was no copy of TDESC 705). If either is the case, DEFINE returns a list whose element is TERM 206. If none of the other cases was true, GETDEF 805 is invoked by DEFINE 607 without a copy of TDESC 705.

GETDEF 805 (page 2 of Appendix 1) receives an undefined term (UTERM) 803 from DEFINE 607 and may also receive a copy of TDESC 705 for the term. In the first case, GETDEF obtains DESC 205 from the user; in the second case, it simply uses TDESC 705. Next it invokes CONVERT 809 to convert it to CDESC 807, which is a LISP form. Next, UTERM 803 and CDESC 807 are provided to PROCESS-FUNCTION 811, which returns TFUNC 701 for UTERM 811. Finally, GETDEF 805 places TSYM 615 on TERMS-STACK 613, and returns a list consisting of DTERM 211 correspond to UTERM 803 to DEFINE 607.

CONVERT 809 (page 7 of Appendix 1) is invoked by DEFINE 607 or GETDEF 805. It receives a DESC 205 from its invoker and converts it to a LISP form, CDESCC 807, which it returns to the invoker. PROCESS-FUNCTION 811 (page 2 of Appendix 1) receives UTERM 803 and CDESC 807, passes UTERM 803 to DEFINE-FUNCTION 813, receives TFUNC 701 from DEFINE-FUNCTION 811, returns TFUNC 701 to GETDEF 805, and produces UTERML 815, which is a list of the UTERMs 803 from CDESC 807 which have not yet been defined. PROCESS-FUNCTION then invokes DEFINE 607 for each UTERM 803 on UTERML 815. DEFINE-FUNCTION 803 (page 2 of appendix 1), finally, creates and evaluates a DEFUN for TFUNC 701, thereby creating TFUNC 701, which it returns to PROCESS-FUNCTION 811, which in turn returns it to GETDEF 805.

As can be seen from the above description, recursive invocations of DEFINE 607 continue until all of the TERMs 206 required to define the TERM 206 for which DEFINE was invoked have been defined; only at that point, DEFINE 606 returns DTERM 211 corresponding to TERM 206. Since the user of Shell 201 must define all of the TERMs 206 required to define a given TERM 206 and can give TERM 206 only a single definition, DEFINE 606 guarantees that a set of definitions for a term 206 is complete and consistent.

11. Prototype Embodiment 2: FIG. 9

Appendix 2 contains the LISP code for prototype embodiment 2 of the present invention. As will be clear to one skilled in the art upon examining appendix 2, prototype embodiment 2 contains many improvements over prototype embodiment 1, including a better interface to the user and more robust recovery from user errors. Among the most important improvements included in prototype embodiment 2 are the alternate embodiments of TDEF 617 and WHAT shown in overview in FIG. 9.

TDEF 901 contains TDESC 705 and tEXVAL 703 as did TDEF 617; it does not contain TFUNC 701, and contains two new fields: TFORM 903 and TTYPE 905. The change was made to eliminate a difficulty with prototype embodiment 1: namely, that the TERM 206 to be defined might correspond to some other LISP symbol already in symbol space 505. In that case, the definition produced by DEFINE 607 for TERM 206 would supersede the previously-existing definition of the symbol. The problem is solved in prototype embodiment 2 by replacing TFUNC 701 with TFORM 903, a LISP form which is not itself executable as a function but may be executed by an EVALUATOR function 911 in TIE 219. TTYPE 905 contains information about the kind of value returned when TFORM 905 is executed by EVALUATOR 911.

The remaining portion of FIG. 9 shows the relationship between WHAT function 907 and EVALUATOR 911 in prototype embodiment 2. WHAT 907 receives the WHAT CFORM 605 from EXPERT 603 as before, but instead of simply performing a LISP eval operation on TSYM 615 provided as an argument to WHAT, it provides TFORM 903 from TDEF 901 for TSYM 615 to evaluator 911, which in turn produces LISP forms to perform the operation specified in TFORM 903 and provides them to LISP interpreter 503. LISP interpreter 503 returns the results of the evaluation of the LISP forms to evaluator 911, which then makes these results into TRES 227, which it returns to WHAT 907, which in turn returns it to the user.

12. Conclusion

The preceding Description of a Preferred Embodiment and the appendices attached thereto have disclosed the best manner presently known to the inventors of implementing a novel expert shell and novel expert systems. The expert systems, though not as powerful as those produced in the prior art, have many of the most important advantages of pior-art expert systems and are particularly well-adapted to situations where what is sought from the expert system is detailed knowledge of complicated procedures. The expert system shell is easier to use than expert system shells of the prior art and guarantees that the definitions making up the knowledge base of an expert system are complete and consistent.

The advantages of the expert system shell and expert systems disclosed herein stem from the fact that the knowledge base used by the expert system consists of terms defined with a hierarchy of definitions in which a given definition depends only on definitions lower than itself in the hierarchy and on external values obtained from a source external to the knowledge base. The expert system makes an inference concerninng a term by requesting the user to supply one or more external values and then determining what value is produced for the term using the external values and the hierarchy of definitions. The hierarchy of definitions is produced in the expert system shell by requesting definitions of terms used to define a given term until all of those terms are completely defined, thereby guaranteeing that the definitions from which the definition of a given term depends are complete and consistent.

While the embodiments herein were implemented in LISP, implementations of the invention are in no way restricted to LISP. It is further to be emphasized that the embodiments disclosed herein, though the best known to the inventors at the present time, are prototypes and intended to be purely exemplary. Thus, the disclosed embodiments are to be considered in all respects as illustrative and not restrictive, the scope of the invention being indicated by the appended claims rather than the foregoing description, and all changes which come within the meaning and range of equivalency of the claims are intended to be embraced therein.

Appendix 1

```
;---------;
; DEFINE  ;  - Handles definition of terms for expert system
;---------;

(defun True  () t)
(defun False () nil)
(defun Yes   () t)
(defun No    () nil)

(setf True  t)
(setf False nil)
(setf Yes   t)
(setf No    nil)

(setq Batch-Define nil)
(setq Terms-Stack  nil)
(setq Arg-Stack    nil)

; If Term is already defined (as a function), returns it ready to
  eval.
```

```
; If Term is a constant, returns it again.
; Else calls GET-DEF to get its definition, returning it ready to
eval.
;
(defmacro Define (Term &optional Exp) (Define* ',Term ',Exp))
(defun Define* (Term &optional Exp)
  (prog2
    (if Exp (setq Batch-Define t))
    (cond
      ((consp Term)        (let ((Fix (Convert Term)))
                             (cons
                               (first Fix)
                               (mapcar #'Define* (rest Fix)))))
      ((not (symbolp Term)) Term)
      (Exp                 (Get-Def Term Exp))
      ((or (fboundp Term)
           Batch-Define)   (list Term))
      (t                   (Get-Def Term)))
    (if Exp (setq Batch-Define nil))
) )
; Asks user for the definition of Term and defines it as a
function.
; If the definition uses terms, DEFINE* is called for each of them.
; Returns Term ready to eval.
;
(defun Get-Def (Term
     &optional (Exp (Prompt "What is the definition of " Term "?
"))
     &aux Def)
  (setq Def (Convert Exp))
  (if (symbolp (first Def))
    (Process-Function Term Def)
    (Process-Constant Term Def))
  (setf (get Term 'DEFINITION) Exp)
  (push Term Terms-Stack)
  (list Term)
)

; Processes function calls.
;
(defun Process-Function (Term Def)
  (cond
    ((member (first Def) '(ASK ASK* COND))
      (Define-Function Term Def)
      (mapc #'(lambda (X) (Define* X '(Literal))) (nth 3 Def)))
    ((equal (first Def) 'FIELD-OF)
      (Define-Function Term `(FIELD-OF ,(second Def) ,(third Def)))
      (Define* (third Def)))
    ((member (first Def) '(FOR-EVERY FOR-SOME WHERE))
      (Define-Function Term Def))
    ((null (rest Def)) (Define-Function Term (Define* (first Def))))
    (t (Define-Function Term
      `(cons (first Def) (mapcar #'Define* (rest Def)))))
) )

; Checks compound expressions for embedded
```

```
; Processes constants.
;
(defun Process-Constant (Term Def)
  (Define-Function Term (first Def))
)

; Calls DEFUN to define Term.
;
(defun Define-Function (Term Def)
  (eval
    (defun ,Term ()
      (prog2
        (push ',Term Arg-Stack)
        ,Def
        (pop Arg-Stack)
) ) ) )

; Puts up prompt and returns experssion.
;
(defun Prompt (&rest Args)
  (terpri)
  (dolist (Arg Args)
    (princ (string Arg)))
  (terpri)
  (princ "  =  ")
  (read-from-string (string-append "(" (Remove-Commas (read-line)) ")"))
)

; Changes commas in Str to blanks, except when in quoted strings.
;
(defun Remove-Commas (Str &aux In-Quote)
  (do ((I 0 (1+ I)))
    ((>= I (length Str)) Str)
    (if In-Quote
      (if (equal (char Str I) # ") (setq In-Quote nil))
      (cond
        ((equal (char Str I) # ,) (setf (char Str I) #  ))
        ((equal (char Str I) # ") (setq In-Quote t))
) ) ) )

; Redefines one or more terms.
;
(defmacro Redefine (&rest Terms) (Redefine* ',Terms))
(defun Redefine* (&optional Terms &aux Not-All)
  (setq Arg-stack NIL)
  (if Terms
    (progn
      (Definition* (first Terms))
      (setq Not-All t))
    (setq Terms Terms-Stack))
  (dolist (Term Terms)
    (remprop Term 'DEFINITION)
    (fmakunbound Term)
```

```
    (setq Terms-Stack (remove Term Terms-Stack))
    (if Not-All (Define* Term))
) )

; Removes the definition of term.
;
(defmacro Undefine (Term)  (Undefine* ',Term))
(defun Undefine* (Term)
  (setq Arg-stack NIL)
  (remprop Term 'DEFINITION)
  (fmakunbound Term)
  (setq Terms-Stack (remove Term Terms-Stack))
  (Show NL Term " definition removed")
)

; Puts out one or more strings.
;
(defun Show (&rest Strs)
  (dolst (Str Strs)
    (princ Str)
) )

(defconstant NL (string 10))

; Show definition of Term and the value of its terms.
;
(defmacro How (Term)  (How* ',Term))
(defun How* (Term)
  (let ((Def (third (third (symbol-function Term))))
        (Val))
    (Show NL Term " is defined to be" NL)
    (Show "   " (get Term 'DEFINITION))
    (when (and (consp Def)
               (not (member (first Def) '(ASK ASK* FIELD COND))))
      (Show NL "where")
      (if (rest Def)
        (dolist (Subterm (rest Def))
          (setq Val (eval Subterm))
          (unless (equal Subterm Val)
            (Show NL "    " Subterm " equals " (Value Val)))
          (if (and (eq (first Def) 'or) Val) (return))
          (if (and (eq (first Def) 'and) (not Val)) (return)))
        (Show NL "    " Def " equals " (eval Def))
) ) ) )

; Show reason Term is needed.
;
(defmacro Why (&optional (Term (first Arg-Stack)))  (Why* ',Term))
(defun Why* (&optional (Term (first Arg-Stack)))
  (let* ((Main-Term (member Term Arg-Stack))
         (Super-Term (second Main-Term)))
    (terpri)
    (cond
      ((null Term) (Show "Why what?"))
```

```
        ((null Main-Term) (Show "The value of " Term
                                " is not currently being sought."))
        ((null Super-Term) (Show "Because you asked for it."))
        (t (Show Term " is needed to determine the value of " Super-Term ","
              NL "which is defined to be:"
              NL "  " (get Super-Term 'DEFINITION)))
) ) )

; Handles True and False values.
;
(defun Value (Val)
  (cond
    ((eq Val t)   'True)
    ((eq Val nil) 'False)
    (t            (Make-String Val))
) )

; Displays value of Term
;
(defmacro What (&rest Term)  (What* ',Term))
(defun What* (Terms)
  (dolist (Term Terms)
    (if (fboundp Term)
      (Show NL "The value of " Term " is " (Value (funcall Term)))
      (Show NL Term " is not currently defined")
) ) )

; Displays the definition of Term.
;
(defmacro Definition (&optional Term)  (Definition* ',Term))
(defun Definition* (&optional Term)
  (if Term
    (print (get Term 'DEFINITION))
    (progn
      (dolist (Term* Terms-Stack)
        (Show NL Term* " = ")
        (prinl (get Term* 'DEFINITION)))
      (Show NL NL (length Terms-Stack) " terms defined.")
) ) )

; Saves current rule to File
;
(defmacro Save (File)  (Save* ',File))
(defun Save* (File)
  (let ((*standard-output*
          (open (string-append File ".RUL") :direction :output)))
    (dolist (Term Terms-Stack)
      (Show "(Define " Term NL "  ")
      (prinl (get Term 'DEFINITION))
      (Show ")" NL))
    (close *standard-output*))
  (Show NL "Rules saved to file " (string-append File ".RUL"))
)
```

```
; Loads previously saved rules from File.
;
(defmacro Restore (&optional File)
  (if File
    (load (string-append ',File ".RUL"))
    (Files "RUL")
) )

; Lists all files in current directory
;
(defun Files (&optional (Ending "*"))
  (mapc
    #'(lambda (Name) (print (pathname-name Name)))
    (directory (string-append "*." Ending)))
  nil
)

; Returns a term as a literal
;
(defun Literal ()
  (first Arg-Stack)
)

; String concatination.
;
(defun !! (&rest Strs &aux Pair)
  (setq Pair
    (string-append (Make-String (first Strs))
                   (Make-String (second Strs))))
  (if (third Strs)
    (apply #'!! (cons Pair (rest (rest Strs))))
    Pair
) )

; Turns numbers to strings.
;
(defun Make-String (Val)
  (if (numberp Val)
    (let* ((Str (format nil "çD" Val))
           (Len (length Str)))
      (cond
        ((equal (subseq Str (max (- Len 4) 1) Len) ".OD0")
          (subseq Str 0 (- Len 4)))
        ((equal (subseq Str (max (- Len 2) 1) Len) "D0")
          (subseq Str 0 (- Len 2)))
        (t Str)))
    (string Val)
) )

; Universal equality function.
; Handles numbers and strings properly.
;
(defun Same (Arg1 Arg2)
```

```
  (if (and (numberp Arg1) (numberp Arg2))
    (= Ar1 Arg2)
    (equal Arg1 Arg2)
) )

; Opposite of Same.
;
(defun Different (Arg1 Arg2)
  (not (Same Arg1 Arg2))
)

; Determines if Val is in the range between Low and High.
;
(defun Between (Val Low High)
  (and (> Val Low)
       (< Val High))
)

; Converts Def to a LISP expression.
;
(defun Convert (Def)
  (Replace Def '(FOR SOME)  0 2 'FOR-SOME)
  (Replace Def '(FOR EVERY) 0 2 'FOR-EVERY)
  (Replace Def '(FIELD OF)  1 3 'FIELD-OF)
  (cond
    ((null (rest Def))   Def)
    ((consp (first Def)) (Conditional Def))
    ((member (first Def) '(FOR-SOME FOR-EVERY))
      (Quantifier (first Def) (second Def) (rest (rest Def))))
    ((equal (second Def) 'WHERE)
      (Quantifier (second Def) (first Def) (rest (rest Def))))
    ((member (first Def) '(NOT - MAX MIN ASK ASK* DISPLAY)) Def)
    (t (Prefix Def))
) )

; Replaces a list of two Terms at Pos1, Pos2 in Def with a single Term.
;
(defmacro Replace (Def Terms Pos1 Pos2 Term)
  (if (equal (subseq ,Def ,Pos1 ,Pos2) ,Terms)
    (setq ,Def
      (subst ,Term (first ,Terms)
        (remove (second ,Terms) ,Def)
) ) ) )

; Handles definition of For-Some, For-Every, and Where.
;
(defun Quantifier (Func Rec Test)
  (Define* Rec)
  (list Func ',Rec ',(Fix-Test Test))
)

; Convert Def from infix notation to prefix, suitable for LISP.
;
(defun Prefix (Def &aux Oper)
```

```
    (setq Oper (second Def))
    (setq Def  (remove Oper Def))
    (cond
      ((eq Oper '=) (setq Oper 'Same))
      ((eq Oper '/=) (setq Oper 'Different)))
    (cons Oper Def)
)

; Needed for conditionals.
;
(defun Otherwise ()
  t
)

; Converts a conditional expression into LISP form.
;
(defun Conditional (Def &aux Body)
  (do* ((Test (first Def)  (first Lst))
        (Val  (second Def) (second Lst))
        (Lst  Def          (rest (rest Lst)))
        (Body nil
           (append Body (list (list (Fix-Test Test) (Define* Val))))))
    ((null Lst)  (cond ,@Body))
) )

; Puts Test in a form suitable to execute
;
(defun Fix-Test (Test)
  (let ((Test* (Convert Test)))
    (if (rest Test*)
        (cons (first Test*) (mapcar #'Define* (rest Test*)))
        (Define* (first Test*))
) ) )

; True if any value returned by Rec satisfies Test.
;
(defun For-Some (Rec Test)
  (setf (get Rec 'Action) 'Read)
  (loop
    (unless (funcall Rec) (return nil))
    (when (eval Test)
      (setf (get Rec 'Action) 'Rewind)
      (funcall Rec)
      (return t)
) ) )

; False if any value returned by Rec fails Test.
;
(defun For-Every (Rec Test)
  (setf (get Rec 'Action) 'Read)
  (loop
    (unless (funcall Rec) (return t))
    (unless (eval Test)
```

```
        (setf (get Rec 'Action) 'Rewind)
        (funcall Rec)
        (return nil)
) ) )

; Returns next value of Rec which satisfies Test.
; If Rec returns NIL, returns NIL.
; If the 'Action property of the current term is 'Rewind,
; Set the 'Action property of Rec to 'Rewind first.
;
(defun Where (Rec Test)
  (setf (get Rec 'Action) (get (first Arg-Stack) 'Action 'Read))
  (loop
    (unless (funcall Rec) (return nil))
    (if (eval Test) (return t))
) )

; Rests the value of Term to Val.
;
(defmacro Assume (Term Val) (Assume* ',Term ,Val))
(defun Assume* (Term Val)
  (setq Arg-stack NIL)
  (set Term Val)
  (setq Sym-bound-list (adjoin Term Sym-bound-list))
)

; Displays multiple values.
;
(defmacro Display (&rest Terms)
  (dolist (Term ',Terms t)
    (Show NL "The value of " (first Term) " is " (Value (eval Term)))
) )

;***********************************************************************
;
;   Expert routines:  Field, Ask, Reset, Expert
;
;***********************************************************************
;
;Global constants (for yes/no questions)
 defconstant   yes-list   '("y" "Y" "yes" "YES" "Yes" "true" "TRUE"
                            "True" "t" "T"))
(defconstant   no-list    '("n" "N" "no" "NO" "No" "f" "F" "false" "FALSE"
                            "False"))

;Global constants for defining data types
(defconstant   text    1)
(defconstant   number  2)
(defconstant   yes-no  3)
(defconstant   choice  4)

;Global constants for How and Why questions
(defconstant   How-Why  '("how" "HOW" "How"
```

```
                        "why"  "WHY"  "Why"
                        "wha"  "WHA"  "Wha"))

;Set Sym-bound-list to NIL - this keeps track of all symbols that are bound
   (setq Sym-bound-list NIL)

;
;   (Field-of  Type  Rec-sym)
;

(defun Field-of (Type  Rec-sym)

;Check to see if there is a record bound
   (if (boundp Rec-sym)

;There is a record - see if we already have the value
       (let ((A-value (assoc (first Arg-Stack) (eval Rec-sym))))
          (if A-value
              (rest A-value)   ;We have the value - return it
              (prog1            ;Ask for the value
                 (setq A-value
                       (ASK* Type (string-append "*** Database Value for "
                                                 "field " (first Arg-Stack)
                                                 " of record " Rec-sym "?"))
                 )
                 ;Put the value in the association list of Rec-sym
                 (set Rec-sym (acons (first Arg-Stack) A-value (eval Rec-sym)))
                 ;Unbind the field symbol and take it out of Sym-bound-list -
                 ;(this was bound and put in the list by ASK* incorrectly).
                 (makunbound (first Arg-Stack))
                 (setq Sym-bound-list (remove (first Arg-Stack) Sym-bound-list))
              )
          ) )

;The record is unbound - produce an error (ask for substitute value)
       (ASK* Type (string-append "*** WARNING:  No " Rec-sym " record.  What "
                                 "is the value of " (first Arg-Stack) "?"))
) )

;
;   (Ask  Type  Prompt  &OPTIONAL  Choice-List)
;

(defmacro Ask (Type Prompt &OPTIONAL Choice-list)
   (if Choice-list
       `(Ask* ,Type ,Prompt ',Choice-list)
       `(Ask* ,Type ,Prompt)
) )

(defun Ask* (Type Prompt &optional Choice-list &Aux (Sym (first Arg-stack)))

;Check to see if the Symbol already has a value
   (if (boundp Sym)
```

```
;The Symbol has a value, so just return it
(eval Sym)

;The Symbol does not have a value, so ask for one
(let ((Value     NIL)
      (Inp-String "")
      (temp-num  0))

;Loop while we have why or how questions
   (loop

;Put up the prompt
      (terpri) (princ Prompt) (princ " ")
      ;If this is a choice question, display the choices.
      (when (= Type Choice)
         (terpri)
         (setq temp-num 1)
         (dolist (i Choice-list)
            (princ "    ") (princ temp-num) (princ ". ")
            (princ i) (terpri)
            (incf temp-num)
         )
         (princ "Enter number  -> ")
      )

;Allow user input
      (setq Inp-string (read-line))
      ;Test for why and how questions
      (if (and (> (length Inp-string) 2)
               (member (subseq Inp-string 0 3) How-why :TEST 'equal))
         (progn
            (eval (read (make-string-input-stream (string-append
                        "(" Inp-string ")"))))
            (terpri)
         )
         (return)
      )
   )

;Convert entry to value - dependent on the data type
   (case Type (1 ;String
         (setq Value Inp-string)
      )
      (2 ;Number
         (setq Value
            (if (zerop (length Inp-String))
                0
                (if (numberp (setq temp-num (Ignore-errors
                            (read-from-string Inp-String))))
                   temp-num
                   0
```

```
                )   )   )
            )
            (3  ;Yes-no
                (setq Value
                        (if (member Inp-String Yes-list :TEST 'equal)
                            T
                            NIL
                )   )
            )
            (4  ;Choice
                (setq Value
                        (nth (1- (if (zerop (length Inp-String))
                                     0
                                     (if (numberp (setq temp-num (Ignore-errors
                                                      (read-from-string Inp-String))))
                                         temp-num
                                         0
                                )    )   )
                                Choice-list
                )   )
            )
        )

;Assign the entered value to the symbol.  The symbol will now
        ;be bound so that any subsequent requests for this symbol will
        ;just return the value.  Also add the symbol to the Sym-bound-list
        (setq Sym-bound-list (adjoin Sym Sym-bound-list))
        (set Sym Value)

)   )   )

;
;   (Record)
;

(defun Record (&aux (sym (first Arg-stack)))

(if (equal 'read (get sym 'action))
        ;Read the next record from the database - first determine if EOF
        (if (progn
                (terpri) (princ (string-append "*** Reading " sym
                                               " record from database."))
                (terpri) (princ "     Is there another record? ")
                (let ((Inp-string (read-line)))
                    (if (member Inp-String Yes-list :TEST 'equal)
                        T
                        NIL
            )   )   )

;Test passed - new record read - set record to nil (no fields
            ;retrieved yet) - and return T.
            (progn (set Sym NIL)
                   (setq Sym-bound-list (adjoin Sym Sym-bound-list))
                   T)
```

```
       ;EOF - unbind symbol and return NIL
       (progn (makunbound Sym)
              (setq Sym-bound-list (remove Sym Sym-bound-list))
              NIL)
     )
     ;Action is rewind - so return NIL and unbind the record
     (progn (makunbound Sym)
            (setq Sym-bound-list (remove Sym Sym-bound-list))
            NIL)
   )
)

;
;  (Reset &rest Syms)
;

(defmacro Reset (&rest Syms)  (Reset* ',Syms))
(defun RESET* (Syms)
   (setq Arg-stack NIL)
   (when (null Syms) (setq Syms Sym-bound-list))
   (dolist (Sym Syms)
      (makunbound Sym)
      (setq Sym-bound-list (remove Sym Sym-bound-list))
) )

;
;  (Expert)
;

(defun Expert (&aux Input-string)

(send *terminal-io* :clear-screen)
   (Show "Definitional Expert" NL NL)
   (loop
      (show NL "->") (setq Input-string (read-line))
      (when (or (equal Input-string "EXIT")
                (equal Input-string "exit"))
         (return))
      (eval (read (make-string-input-stream
             (string-append "(" Input-string ")"))))
) )
```

Appendix 2

The modules for the second prototype implementation are ordered in the following listing alphabetically by module name. DRIVER is the module which receives user commands.

;

```
; ASK    -  Ask routines for SOCRATES prototype
;
; The following functions are in this file
;
;    Ask-text   - Translate grammar of Ask text to general Ask
function
;    Ask-number - Translate grammar of Ask number to general Ask
function
;    Ask-yes-no - Translate grammar of Ask yes-no to general Ask
function
;    Ask        - Handles general user interaction for terms
defined as "ask"
;

;
; Constants
;

(defconstant   yes-list   '("y" "yes" "true" "t"))
(defconstant   no-list    '("n" "no" "false" "f"))

;Global constants for defining data types
(defconstant   asktext    1)
(defconstant   asknumber  2)
(defconstant   askyes-no  3)
(defconstant   askchoice  4)

;Global constants for How and Why and What questions
(defconstant   How-Why    '("how" "why"))

;;;;;;;;;;;;;;;;;;;;;;;;;;
;;                      ;;
;;      Ask-text        ;;
;;                      ;;
;;;;;;;;;;;;;;;;;;;;;;;;;;

(defun Ask-text (&rest text-list)
  (if (> (length text-list) 1)
    (Ask askchoice (first text-list) (rest text-list))
    (Ask asktext   (first text-list))
) )

;;;;;;;;;;;;;;;;;;;;;;;;;;
;;                      ;;
;;      Ask-number      ;;
;;                      ;;
;;;;;;;;;;;;;;;;;;;;;;;;;;

(defun Ask-number (&rest text-list)
  (if (> (length text-list) 1)
    (let ((Entry-text (Ask askchoice (first text-list) (rest text-list))))
      (Set-Val (first Arg-stack)
```

```
                (- (length text-list)
                   (length (member Entry-text text-list :TEST
'equal))))
    )
    (Ask asknumber (first text-list))
) )

;;;;;;;;;;;;;;;;;;;;;;;;;;
;;                      ;;
;;     Ask-yes-no       ;;
;;                      ;;
;;;;;;;;;;;;;;;;;;;;;;;;;;

(defun Ask-yes-no (&optional prompt)
  (Ask askyes-no prompt)
)

;;;;;;;;;;;;;;;;;;;;;;;;;;
;;                      ;;
;;        Ask           ;;
;;                      ;;
;;;;;;;;;;;;;;;;;;;;;;;;;;

(defun Ask (Type Prompt &optional Choice-list &Aux (Sym (first Arg-stack))
                                                   Value)

;Check to see if the Symbol already has a value
  (if (neq (setq Value (Get-Val Sym)) 'UNKNOWN)

;The Symbol has a value, so just return it
    (Return-Val Value)

;The Symbol does not have a value, so ask for one
    (let ((Inp-String "")
          (temp-num    0))

(unless Prompt (setq Prompt (string-append "What is the value for "
        (string Sym) "?")))

;Loop while we have why or how questions, or invalid entry
      (block Entry-loop (loop ;Put up the prompt
        (terpri) (princ Prompt) (princ " ")
        ;If this is a choice question, display the choices.
        (when (= Type askchoice)
          (terpri)
          (setq temp-num 1)
          (dolist (i Choice-list)
            (princ "     ") (princ temp-num) (princ ". ")
            (princ i) (terpri)
            (incf temp-num)
```

```
    )
    (princ "Enter number -> ")
)

;Allow user input
(setq Inp-string (read-line))

;Test for why and how questions
(if (string-equal Inp-string "WHY")

;Entry is "why" question
(let ((Why-stack-ptr    0))         ;1st element in arg-stack
   (loop     ;continue for all why and how questions
      (if (string-equal Inp-string "WHY")
        (progn
          (Why* (nth Why-stack-ptr Arg-stack))
          (unless (= why-stack-ptr (1- (length Arg-stack)))
            (incf Why-stack-ptr 1))
        )
        (eval (read (make-string-input-stream (string-append
                    "(" Inp-string ")"))))
      )
      (terpri)
      (setq Inp-string (read-line))
      (unless (and (> (length Inp-string) 2)
                   (member (subseq Inp-string 0 3) How-why :TEST 'equal))
        (return)
) ) )

;Entry i not "why"
;Convert entry to value - dependent on the data type
(case Type (1 ;String
      (if (zerop (length Inp-String))
        (progn (terpri) (princ "Invalid text entry") (terpri))
        (progn (setq Value Inp-string) (return-from entry-loop))
   ) )
   (2 ;Number
      (setq Value
            (if (zerop (length Inp-String))
                NIL
                (if (numberp (setq temp-num (Ignore-errors
                       (read-from-string (Fix-Number Inp-String)))))
                    temp-num
                    NIL
      )  )  )
      (if Value
        (return-from entry-loop)
        (progn (terpri) (princ "Invalid number entry") (terpri))
   )  )
```

```
        (3 ;Yes-no
           (setq Value
                 (cond
                    ((member Inp-String Yes-list :TEST 'string-equal)
                      'YES)
                    ((member Inp-String No-list :TEST 'string-equal)
                      'NO)
                    (T
                      NIL)
                 )   )
           (if Value
             (return-from entry-loop)
             (progn (terpri) (princ "Invalid yes/no entry") (terpri))
         )  )
        (4 ;Choice
           (setq Value
                 (nth (1- (if (zerop (length Inp-String))
                              32000   ;set beyond end of list for NIL
                              (if (integerp (setq temp-num (Ignore-errors
                                        (read-from-string Inp-String))))
                                  (if (< temp-num 1)
                                      32000
                                      temp-num)
                                  32000
                          )  )  )
                      Choice-list
           )   )
           (if Value
             (return-from entry-loop)
             (if (member Inp-string Choice-list :TEST 'equal)
               (progn (setq Value Inp-string) (return-from entry-loop))
               (progn (terpri) (princ "Invalid choice") (terpri))
         )  )  )
       ) ; end of case )  ))   ;end of if, and end of loop and block (setq Value (Return-Val Value))
    (Set-Val Sym Value)

)  )  )

; Converts YES and NO to T and NIL.
;
(defun Return-Val (Value)
  (case Value
    (YES  t)
    (NO   nil)
    (t    Value)
)  )

; Converts number text entered by user to form ready for LISP.
; Removes commas and dollar signs and makes double percision.
;
(defun Fix-Number (Str)
  (do ((I 0 (1+ I)))
      ((>= I (length Str)) (string-append Str "D0"))
```

```
          (if (member (char Str I) '(# , # $))
            (setq Str
                  (string-append (subseq Str 0 I) (subseq Str (1+ I)))
) ) ) )

;---------;
; CONVERT ; - Converts between string and list forms of term definition
;---------;

; Notation:  Str  -> Definition as seen by user, including commas.
;            Syms -> Symbol list made from Str.  Not in prefix notation.
;            Def  -> Symbol list made from Syms.  In prefix notation.

(defvar Error-Msg)   ; set by Syms-To-Def if parse error.

; Returns list of all terms referenced in Def.
;
(defun Terms-In-Def (Def)
  (cond
    ((member Def '(YES NO NL nil))
      nil)
    ((symbolp Def)
      (list Def))
    ((listp   Def)
      (Unique-List (apply #'append (mapcar #'Terms-In-Def (rest Def)))))
    (t
      nil)
) )

; Returns Lst with duplicate elements removed.
;
(defun Unique-List (Lst &aux Set)
  (dolist (Elem Lst (reverse Set))
    (setq Set (adjoin Elem Set))
) )

; Returns list of all undefined terms referenced in Def.
;
(defun Undefined-Terms-In-Def (Def)
  (remove-if #'Get-Def (Terms-In-Def Def))
)

; Converts Str to symbol list.
;
(defun Str-To-Syms (Str &aux Result)
  (setq Result (multiple-value-list (ignore-errors
    (read-from-string (string-append "(" (Fix-Commas Str) ")")))))
  (if (second Result)
    (Then
      (setq Error-Msg "Invalid expression")
      nil)
    (first Result)
) )

; Changes commas in Str to underscores, except when in quoted strings.
;
(defun Fix-Commas (Str &aux In-Quote)
```

```
(do ((I 0 (1+ I)))
    ((>= I (length Str)) Str)
    (if In-Quote
        (if (equal (char Str I) # ") (setq In-Quote nil))
        (cond
          ((equal (char Str I) # ,)
            (setq Str
                  (string-append (subseq Str 0 I) "   " (subseq Str (1+ I)))))
          ((equal (char Str I) # ") (setq In-Quote t))
) ) ) )

; Sets Error-Msg to Msg and returns to nil to Parse.
;
(defun Err (&rest Msg)
  (setq Error-Msg "")
  (dolist (Part Msg)
    (setq Error-Msg (string-append Error-Msg (Make-Str Part))))
  (return-from Parse)
)

; Converts any LISP construct into a string.
;
(defun Make-Str (Thing)
  (if (listp Thing)
    (format nil "çS" Thing)
    (format nil "çA" Thing)
) )

; Converts Sym to a form ready to display to user.
; Converts to lower case and changes dash to blank.
;
(defun Sym-To-Display (Sym &aux Str)
  (setq Str (string Sym))
  (do ((I 0 (1+ I)))
    ((>= I (length Str)) Str)
    (cond
      ((and (>= (char Str I) # A)
            (<= (char Str I) # Z))
        (setf (char Str I) (+ (char Str I) 32)))
      ((= (char Str I) # -)
        (setf (char Str I) #  ))
) ) )

; Converts Syms list to definition.
; If error, sets Error-Message and returns nil.
;
(defun Syms-To-Def (Syms Type)
  (when Syms
    (block Parse
      (if (member Type '(NUMBER TEXT YES-NO STREAM))
        (Try (eval Type) Syms)
        (Err Syms " has an invalid type of " Type))
) ) )

; Tries to parse Syms according to Grammar table.
; Returns result of the first successful parse or NIL.
;
```

```
(defun Try (Grammar Syms &aux Matches Result)
  (dolist (Template Grammar)
    (let ((Text-Tmp (first Template))
          (Func-Tmp (rest  Template)))
      (cond
        ((equal Text-Tmp 'Try)
          (setq Result (Try (eval (first Func-Tmp)) Syms))
          (when Result (return Result)))
        ((setq Matches (Match Syms Text-Tmp))
          (return (Fill-In Matches Func-Tmp)))
) ) ) )

; Returns result of filling in Func-Tmp using contents of Matches.
; Validates contents of Matches first, generating error if any fail.
; The list of validating functions is padded to allow for the @ template.
;
(defun Fill-In (Matches Func-Tmp &aux Result)
  (if (equal (first Func-Tmp) 'SELF)
    (Parse-Arg (first (rest Func-Tmp)) (first Matches))
    (cons (first Func-Tmp)
      (if (consp Matches)
        (mapcar #'Parse-Arg
          (Pad (rest Func-Tmp) (length Matches))
          Matches
) ) ) ) )

; Returns result of Test on argument Arg.
; Test may be a function or a grmmar table.
; Generates error if fails test.
;
(defun Parse-Arg (Test Arg &aux Result)
  (if (fboundp Test)
    (setq Result (funcall Test Arg))
    (setq Result (Try (eval Test) Arg)))
  (if Result
    Result
    (Err Arg " is not a " (Sym-To-Display Test))
) )

; Pads Lst to length Len using the last element as the pad.
;
(defun Pad (Lst Len)
  (setq Len (- Len (length Lst)))
  (if (> Len 0)
    (append Lst (make-list Len :initial-element (first (last Lst))))
    Lst
) )

; If Sym has no type, sets its type to Type.
; Else, checks to see if it matches Type.
; Returns either Sym or nil.
;
(defun Check-Type (Sym Type &aux Sym-Type)
  (setq Sym-Type (Get-Type Sym))
  (cond
    ((equal Sym-Type Type)
      Sym)
```

```
      ((equal Sym-Type nil)
        (Set-Type Sym Type)
        Sym)
      (t
        nil)
) )

; Determines if Sym is a number or a number term.
;
(defun Number-Or-Number-Term (Sym)
   (setq Sym (first Sym))
   (cond
      ((symbolp Sym) (Check-Type Sym 'NUMBER))
      ((numberp Sym) Sym)
) )

; Determines if Sym is text or a text term.
;
(defun Text-String-Or-Text-Term (Sym)
   (setq Sym (first Sym))
   (cond
      ((equal Sym 'NL) Sym)
      ((symbolp Sym) (Check-Type Sym 'TEXT))
      ((stringp Sym) Sym)
) )

; Determines if Sym is a yes-no term.
;
(defun Yes-No-Term (Sym)
   (setq Sym (first Sym))
   (cond
      ((member Sym '(YES NO)) Sym)
      ((symbolp Sym) (Check-Type Sym 'YES-NO))
) )

; Determines if Sym is a stream term.
;
(defun Stream-Term (Sym)
   (when (null (rest Sym))
      (setq Sym (first Sym))
      (cond
         ((symbolp Sym) (Check-Type Sym 'STREAM))
) ) )

; Determines if Sym is a table term.
;
(defun Table-Term (Sym)
   (when (null (rest Sym))
      (setq Sym (first Sym))
      (cond
         ((symbolp Sym) (Check-Type Sym 'STREAM)) ;NOTE: change to TABLE
) ) )

; Used to force error when no template matches.
;
(defun Valid-Number-Expression (Syms)
   nil
)
```

```
; Used to force error when no template matches.
;
(defun Valid-Text-Expression (Syms)
   nil
)

; Used to force error when no template matches.
;
(defun Valid-Yes-No-Expression (Syms)
   nil
)

; Used to force error when no template matches.
;
(defun Valid-Stream-Expression (Syms)
   nil
)

;--------;
; DEFINE ;  - Interacts with user to define a SOCRATES expert application.
;--------;

(defvar Undefined-Term-List nil) ;List of terms to be defined.

; Initiates the definition of a term.
;
(defmacro Define (&optional Term Type Str)   (Define* ',Term ',Type ,Str))
(defun Define* (&optional Term Type Str)
   (block Define-Loop
     (if Str
        (Define-Term Term Type Str)
        (Else
           (if Term (Define-Term Term Type))
           (loop
             (setq Term (first Undefined-Term-List))
             (if (null Term) (return-from Define-Loop 'DONE))
             (if (Get-Def Term)
                (pop Undefined-Term-List)
                (Define-Term Term)
) ) ) ) ) )

; Defines Term of Type.
;
(defun Define-Term (Term &optional Type Str &aux Def)
   (setq Term-List (adjoin Term Term-List))
   (unless Type
     (unless (setq Type (Get-Type Term))
        (setq Type
           (Get-Name "Type of " Term " (Number, Text, Yes-No, Table) = "))))
        (unless (member Type '(NUMBER TEXT YES-NO TABLE))
           (princ "Invalid type")
           (return-from Define-Loop 'ERROR))
   (Set-Type Term Type)
   (unless Str
     (setq Str (Get-String Type " definition of " Term NL " = ")))
   (when (or (equal Str "")
             (equal Str "undefined"))
```

```
      (push Term Undefined-Term-List)
      (return-from Define-Loop 'PAUSE))
    (setq Def (Syms-To-Def (Str-To-Syms Str) Type))
    (when (Cycle Term Def)
      (setq Error-Msg "Cyclic definition")
      (setq Def nil))
    (if Def
      (Then
        (Set-Def Term Type Def)
        (setq Undefined-Term-List
          (nconc (Undefined-Terms-In-Def Def) Undefined-Term-List)))
      (Else
        (princ Error-Msg)
        (Define-Term Term)
) ) )

; Redefines a term, ignoring it type.
;
(defmacro Redefine (Term)  (Redefine* ',Term))
(defun Redefine* (Term)
  (remprop Term :TERM-TYPE)
  (Define* Term)
)

; Prompts the user for a string.
;
(defun Get-String (&rest Strs)
  (terpri)
  (dolist (Str Strs)
    (princ Str))
  (read-line)
)

; Prompts the user for a name.
;
(defun Get-Name (&rest Strs)
  (terpri)
  (dolist (Str Strs)
    (princ Str))
  (read)
)

; Detects a cycle of Term in Def.
;
(defun Cycle (Term Def)
  (let ((Terms (Terms-In-Def Def)))
    (if (member Term Terms)
        t
        (dolist (Sub-Term Terms)
          (if (Cycle Term (Get-Def Sub-Term))
              (return t)
) ) ) ) )
;----------;
; DESCRIBE ; - Converts Definition of a term back to external form.
;----------;

; Converts Def to a string for display to the user
;
```

```
(defun Def-To-Str (Type Def)
  (if Def
    (string-right-trim " " (Scan Type Def))
    "undefined"
) )

; Scans Grammar table to find the external template for Def.
;
(defun Scan (Grammar Def &aux Func)
  (if (atom Def)
    (Add-Argument "" Def)
    (dolist (Template (eval Grammar))
      (cond
        ((equal (first Template) 'Try)
          (setq Result (Scan (second Template) Def))
          (when Result (return Result)))
        ((equal (first Def) (second Template))
          (return (Fill-Out (first Template)
                           (rest (rest Template))
                           (rest Def))))
) ) ) )

; Creates external form from Pattern using Args.
;
(defun Fill-Out (Pattern Grammars Args &aux Arg Pat Gram)
  (let ((Str        "")
        (Arg-Ptr    0)
        (Arg-End    (length Args))
        (Pat-Ptr    0)
        (Pat-End    (length Pattern))
        (Last-Gram  (1- (length Grammars))))
    (loop
      (setq Pat  (nth Pat-Ptr Pattern))
      (setq Arg  (nth Arg-Ptr Args))
      (setq Gram (nth (min Arg-Ptr Last-Gram) Grammars))
      (cond
        ((and (= Arg-Ptr Arg-End)
              (= Pat-Ptr Pat-End))
          (return Str))
        ((equal Pat '[)
          (if (= Arg-Ptr Arg-End)
            (setq Pat-Ptr Pat-End)
            (incf Pat-Ptr)))
((equal Pat '!)
  (if (listp Arg)
    (setq Str (string-append Str "("
              (string-right-trim " " (Scan Gram Arg)) ") "))
    (setq Str (string-append Str (Scan Gram Arg))))
  (incf Arg-Ptr)
  (incf Pat-Ptr))
((equal Pat '?)
  (setq Str (string-append Str (Scan Gram Arg)))
  (incf Arg-Ptr)
  (incf Pat-Ptr))
((equal Pat '(?))
  (setq Str (string-append Str "("
            (string-right-trim " " (Scan Gram Arg)) ") "))
```

```
            (incf Arg-Ptr)
            (incf Pat-Ptr))
          ((equal Pat '@)
            (setq Pat (nth (1+ Pat-Ptr) Pattern))
            (cond
              ((null Pat)
                (if (= Arg-Ptr Arg-End)
                  (return Str)
                  (decf Pat-Ptr)))
              ((< Arg-Ptr Arg-End)
                (setq Str (Add-Keyword Str Pat))
                (decf Pat-Ptr))
              (t
                (incf Pat-Ptr 2))))
          (t  ;literal in pattern
            (setq Str (Add-Keyword Str Pat))
            (incf Pat-Ptr))
))))

; Adds a Keyword to Str.
; Keywords are displayed in lower case.
;
(defun Add-Keyword (Str Keyword)
  (if (equal Keyword ' )
    (string-append (string-right-trim " " Str) ", ")
    (string-append Str (Lower-Case (string Keyword)) " ")
) )
; Adds an Arg to Str.
; Arguments which are not constants are displayed in upper case.
;
(defun Add-Argument (Str Arg)
  (cond
    ((member Arg '(TRUE FALSE))
      (Add-Keyword Arg))
    ((numberp Arg)
      (format nil "çD " Arg))
    ((stringp Arg)
      (string-append (string # ") Arg (string # ") " "))
    (t
      (string-append Str (string Arg) " "))
) )

; Converts to lower case.
;
(defun Lower-Case (Str)
  (do ((I 0 (1+ I)))
    ((>= I (length Str)) Str)
    (if (and (>= (char Str I) # A)
             (<= (char Str I) # Z))
      (setf (char Str I) (+ (char Str I) 32))
) ) )
;
;  Driver for SOCRATES prototype
;
;  The following functions are contained in this file
;
```

```
;    Socrates    - Sets up environment for SOCRATES. Clears the screen,
;                  puts up box and titles, sets scroll window, and handles
;                  input of commands.
;
;    Write-sbox  - Write a box around the perimeter of the screen.
;

;;;;;;;;;;;;;;;;;;;;;;;;
;;                    ;;
;;     Socrates       ;;
;;                    ;;
;;;;;;;;;;;;;;;;;;;;;;;;

(defvar Result)
(defvar Message)

; Macros to make IF clauses more readable.
;
(defmacro Then (Arg &rest Args)
  (if Args
    (progn ,Arg ,@Args)
    ,Arg
) )
(defmacro Else (Arg &rest Args)
  (if Args
    (progn ,Arg ,@Args)
    ,Arg
) )

(defun OK (&aux Input-string)

(let ((*BREAK-EVENT* 'Break-Handler)
        (Cmd)
        (Invalid))
    (send *terminal-io* :set-position 0 0)
    (send *terminal-io* :set-size 80 25)
    (send *terminal-io* :clear-screen)
    (princ " OFFICE KNOWLEDGE")
    (send *terminal-io* :set-cursorpos 60 0)
    (princ "Wang Expert Systems")
    (Write-sbox)
    (send *terminal-io* :set-cursorpos 21 24)
    (princ " (Copyright Wang Laboratories, 1985) ")
    (send *terminal-io* :set-position 2 2)
    (send *terminal-io* :set-size 76 21)
    (send *terminal-io* :clear-screen)
    (loop
      (princ "* ") (setq Input-string (read-line))
      (when (string-equal Input-string "EXIT") (Exit-Driver))
      (multiple-value-setq (Cmd Invalid) (ignore-errors
            (read-from-string (string-append "(" Input-string ")"))))
      (if (or Invalid
              (listp (first Cmd)))
        (princ "Invalid expression")
        (if (fboundp (first Cmd))
          (Then
            (multiple-value-setq (Result Message)
```

```
                    (ignore-errors (eval Cmd)))
              (if Message (princ "Command execution error")))
           (princ "Unknown command")))
      (terpri)
      (terpri)
) ) )

; Break handler for Socrates.
;
(defun Break-Handler (&rest Ignore)
  (Exit-Driver)
  (break)
)

; Restores windows before exitting.
;
(defun Exit-Driver ()
  (send *terminal-io* :set-position 0 0)
  (send *terminal-io* :set-size 80 24)
  (send *terminal-io* :clear-screen)
  (return 'End)
)

; Displays reason for last execution error.
;
(defun What ()
  (if Message
     (princ Message)
     (Else
        (princ "The result of the last execution was ")
        (prinl Result)
) ) )

;;;;;;;;;;;;;;;;;;;;;;;;;;;;;;;;;;;;;;;;
;;                                    ;;
;;                                    ;;
;;    Write-sbox   - Write box        ;;
;;    around terminal io window       ;;
;;                                    ;;
;;                                    ;;
;;;;;;;;;;;;;;;;;;;;;;;;;;;;;;;;;;;;;;;;

(defun Write-sbox ()

(send *terminal-io* :set-cursorpos 0 1)
  (send *terminal-io* :write-char 15)
  (dotimes (i 78) (send *terminal-io* :write-char 12))
  (send *terminal-io* :write-char 13)
  (do ((i 2 (1+ i))) ((= i 24) i)
     (send *terminal-io* :set-cursorpos 0 i)
     (send *terminal-io* :write-char 8)
     (send *terminal-io* :set-cursorpos 79 i)
     (send *terminal-io* :write-char 8)
  )
  (send *terminal-io* :set-cursorpos 0 23)
  (send *terminal-io* :write-char 14)
  (dotimes (i 78) (send *terminal-io* :write-char 12))
  (send *terminal-io* :write-char 11)
)
```

```
; Clear screen.
;
(defun Clear ()
  (send *terminal-io* :clear-screen)
)

;---------;
; EXECUTE ; - Handles execution of terms
;---------;

(defvar Arg-Stack)      ; Stack of terms being computed.

; Prints the value of Term.
;
(defmacro Solve (Term) (Solve* ',Term))
(defun Solve* (Term)
  (block Solve
    (setq Arg-Stack nil)
    (format t "ç%çA = çA" Term (Display-Val (Value* Term)))
) )

; Converts Val to external form.
;
(defun Display-Val (Val)
  (cond
    ((equal Val t)
      "YES")
    ((null Val)
      "NO")
    ((numberp Val)
      (Number-As-Text Val))
    (t
      Val)
) )

; Evaluates Expr and returns its value.
;
(defmacro Value (Expr) (Value* ',Expr))
(defun Value* (Expr &aux Result)
  (cond
    ((null Expr)
      (Prt (first Arg-Stack) " is undefined")
      (setq Arg-Stack nil)
      (return-from Solve))
    ((equal Expr 'NL)
      NL)
    ((equal Expr 'YES)
      t)
    ((equal Expr 'NO)
      nil)
    ((symbolp Expr)
      (setq Result (Get-Val Expr))
      (when (equal Result 'UNKNOWN)
        (push Expr Arg-Stack)
        (setq Result (Value* (Get-Def Expr)))
```

```
        (pop Arg-Stack)
        (Set-Val Expr Result))
      Result)
    ((atom Expr)
      Expr)
    (t
      (eval (cons (first Expr)
                  (mapcar #'(lambda (X) (list 'Value X)) (rest Expr))))
) ) )
```

```
;----------------------------------------------------;
; Runtime routines needed to impliment the grammar.  ;
; Routines for ASK and FIELD are in other files      ;
; The following LISP builtins are also used:         ;
;   MAX MIN + -                                      ;
;   STRING-APPEND                                    ;
;   OR AND NOT EQUAL = /= > < >= <=                  ;
;----------------------------------------------------;
```

```
; Same as IF but has the test in the middle.
;
(defmacro Then-If (Then Test Else)
  `(if ,Test ,Then ,Else)
)

; Returns Then expression.  The Test is just for documentation.
;
(defmacro Otherwise-If (Then Test)
  ,Then
)

; Returns Then expression.
;
(defmacro Otherwise (Then)
  ,Then
)

; Same as "*" but stops after encounters a zero.
;
(defmacro Multiply (&rest Args) `(Multiply* ',Args))
(defun Multiply* (Args &aux (Result 1.0D0))
  (dolist (Arg Args Result)
    (setq Result (* Result (eval Arg)))
    (if (zerop Result) (return Result))
) )

; Same as "/" but stops after encounters a zero.
;
(defmacro Divide (Arg &rest Args) `(Divide* ',Arg ',Args))
(defun Divide* (Arg Args &aux Result)
  (setq Result (eval Arg))
  (if (zerop Result)
    Result
    (/ Result (Multiply* Args))
) )

; Same as "-" on a single number.
;
```

```
(defmacro Negative (Num)
  (- ,Num)
)

; Returns Exp. Used to record use of parenthesis when displaying to user.
(defmacro Paren (Exp)
   ,Exp
)

; Returns the capitalized form of Str.
;
(defun Capitalize (Str)
  (do ((I 0 (1+ I)))
    ((>= I (length Str)) Str)
    (if (and (>= (char Str I) # a)
             (<= (char Str I) # z))
      (setf (char Str I) (- (char Str I) 32))
) ) )

; Converts Num to a text string.
;
(defun Number-As-Text (Num)
  (let* ((Str (format nil "çD" Num))
         (Len (length Str)))
    (cond
      ((equal (subseq Str (max (- Len 4) 1) Len) ".0D0")
         (setq Str (subseq Str 0 (- Len 4))))
      ((equal (subseq Str (max (- Len 2) 1) Len) "D0")
         (setq Str (subseq Str 0 (- Len 2)))))
    (Insert-Commas Str)
) )

; Inserts commas into a number string for display.
;
(defun Insert-Commas (Str &aux Decimal)
  (setq Decimal (string-search "." Str))
  (unless Decimal (setq Decimal (length Str)))
  (if (= Decimal (- (length Str) 2))
    (setq Str (string-append Str "0")))
  (do ((I (- Decimal 3) (- I 3)))
    ((<= I 0) Str)
    (setq Str (string-append (subseq Str 0 I) "," (subseq Str I)))
) )

; Converts Boolean to the string "YES" or "NO".
;
(defun Yes-No-As-Text (Boolean)
  (if Boolean
    "YES"
    "NO"
) )

; Inequality operator for text strings.
;
(defun Not-Equal (Str1 Str2) (not (equal Str1 Str2))
)
```

```
; Does exponential for integer Power.
; Remove when GCLISP supports EXP.
;
(defun Exp (Num Power &aux (Result 1.0d0))
  (setq Power (truncate Power))
  (if (minusp Power)
      (/ (Exp Num (- Power)))
      (dotimes (I Power Result)
        (setq Result (* Result Num))
) ) )

; Rounds Num to the nearest Level.
;
(defun Rounded-To (Num Level)
  (* (Int (/ (+ Num (* Level .5)) Level)) Level)
)

; Removes fractional portion of Num.
; Does it in two parts to avoid fixnum overflow.
;
(defun Int (Num &aux Top)
  (setq Top (* (truncate (/ Num 10000.0)) 10000.0))
  (+ Top (truncate (- Num Top)))
)

;---------;
; EXPLAIN ; - Explains How and Why.
;---------;

; Explains how the value of Term was determined.
;
(defmacro How (Term) (How* ',Term))
(defun How* (Term)
  (let ((Def   (Def-To-Str (Get-Type Term) (Get-Def Term)))
        (Val   (Display-Val (Get-Val Term)))
        (Terms (Terms-In-Def (Get-Def Term))))
    (Prt NL Term " has a value of " Val NL)
    (if (equal Val 'UNKNOWN)
        (Prt "because it's value has not been needed yet.")
        (Else
          (Prt "because it is defined to be" NL "   " Def)
          (when Terms
            (Prt NL "where")
            (dolist (Sub-Term Terms)
              (Prt NL "   " Sub-Term " has a value of "
                   (Display-Val (Get-Val Sub-Term)))
) ) ) ) )

; Explains why the value of Term is needed.
;
(defun Why* (Term)
  (let* ((Main-Term  (member Term Arg-Stack))
         (Super-Term (second Main-Term))
         (Def        (Def-To-Str (Get-Type Super-Term) (Get-Def Super-Term)))
         (Terms      (Terms-In-Def (Get-Def Super-Term))))
    (terpri)
    (cond
```

```
    ((null Main-Term)
      (Prt "The value of " Term " is not currently being sought."))
    ((null Super-Term)
      (Prt "The value of " Term " was requested by the user."))
    (t
      (Prt "The value of " Term NL
           "is needed to solve the value of " Super-Term ","
           NL "which is defined to be:" NL "    " Def)
      (when Terms
        (Prt NL "where")
        (dolist (Sub-Term Terms)
          (Prt NL "    " Sub-Term " has a value of "
            (Display-Val (Get-Val Sub-Term)))
))))))

;---------;
; GRAMMAR ; - Rules of grammar for SOCRATES
;---------;

;----------------------------------------------------------;
; The following are tables which describe the grammar.     ;
; Each table is a list.                                    ;
; The elements of the list is such that:                   ;
;   (first element) = text template to match               ;
;   (rest  element) = function template to fill in or      ;
;                     function to be called                ;
; If the text template = 'Try, then the function           ;
; template is used as a table.                             ;
;                                                          ;
; !  - matches exactly one element.                        ;
; ?  - matches one or more element.                        ;
; (?) - means one parenthetic element.                     ;
; [  - mean that the rest of the template is optional.     ;
; @  - means repeat previous wildcard 0 or more times,     ;
;      seperated by the symbol which follows the @.        ;
;----------------------------------------------------------;

. Parses the definition of numbers.
;
(setq Number
  '(((FIELD OF ? [    ?)
       Field-Number Table-Term Number-Field-Form)
    ((ASK [ ? @   )
       Ask-Number Text-Form)
    ((? IF ?    ?)
       Then-If Number-Form Yes-No-Form Number-Case)
    ((?    FOR THE ?)
       For-The Number-Form Stream-Form)
    ((MAX ! @)
       max Number-Form)
    ((MIN ! @)
       min Number-Form)
    (Try Aggregate)
    (Try Number-Form)
    ((?)
       Self Valid-Number-Expression)
))
```

```
; Parses simple arithmetic expressions.
;
(setq Number-Form
  '(((? ROUNDED TO ?)
      Rounded-To Number-Form Number-Form)
    ((? + ? @ +)
      + Number-Form Number-Form)
    ((? - ? @ -)
      - Number-Form Number-Form)
    ((? * ? @ *)
      Multiply Number-Form Number-Form)
    ((? / ? @ /)
      Divide Number-Form Number-Form)
    ((?   ?)
      Exp Number-Form Number-Form)
    ((- ?)
      Negative Number-Form)
    (((?))
      Paren Number-Form)
    ((!)
      Self Number-Or-Number-Term)
) )

; Parses rest of a number case statement.
;
(setq Number-Case
  '(((? IF ?   ?)
      Then-If Number-Form Yes-No-Form Number-Case)
    ((? IF ?)
      Otherwise-If Number-Form Yes-No-Form)
    ((? OTHERWISE)
      Otherwise Number-Form)
) )

; Parses number aggregates.
;
(setq Aggregate
  '(((TOTAL ? OF EVERY ?)
      Total-Every Number-Form Stream-Form)
    ((MAX ? OF EVERY ?)
      Max-Every Number-Form Stream-Form)
    ((MIN ? OF EVERY ?)
      Min-Every Number-Form Stream-Form)
    ((AVERAGE ? OF EVERY ?)
      Average-Every Number-Form Stream-Form)
    ((PERCENTAGE OF ? WHERE ?)
      Percentage Stream-Form Yes-No-Form)
    ((NUMBER OF ?)
      Number-Of Stream-Form)
) )
; Parses number field forms.
;
(setq Number-Field-Form
  '(((DEFAULT VALUE ?)
      Default-Value Number-Form)
    ((VALUES ! @  )
```

```
         Values Number-Form)
    ((REQUEST ?)
         Request Text-Form)
) )

;---------------------------------------;

; Parses definitions of text.
;
(setq Text
  '(((FIELD OF ! [   ?)
        Field-Text Table-Term Text-Field-Form)
    ((ASK [ ? @  )
        Ask-Text Text-Form)
    ((? IF ?   ?)
        Then-If Text-Form Yes-No-Form Text-Case)
    ((?    FOR THE ?)
        For-The Text-Form Stream-Form)
    (Try Text-Form)
    ((?)
        Self Valid-Text-Expression)
) )

; Parses simple text expressions.
;
(setq Text-Form
  '(((?    ? @  )
        string-append Text-Form Text-Form)
    ((CAPITALIZE ?)
        Capitalize Text-Form)
    ((NUMBER ?)
        Number-As-Text Number-Form)
    ((YES-NO ?)
        Yes-No-As-Text Text-Form)
    ((!)
        Self Text-String-Or-Text-Term)
) )

; Parses rest of a Text case statement.
;
(setq Text-Case
  '(((? IF ?   ?)
        Then-If Text-Form Yes-No-Form Text-Case)
    ((? IF ?)
        Otherwise-If Text-Form Yes-No-Form)
    ((? OTHERWISE
        Otherwise Text-Form)
) )

; Parses text field forms.
;
(setq Text-Field-Form
  '(((DEFAULT VALUE ?)
        Default-Value Text-Form)
    ((VALUES ? @  )
        Values Text-Form)
    ((REQUEST ?)
```

```
        Request Text-Form)
) )

;----------------------------------------;
;
; Parses definitions of yes-no definitions.
;
(setq Yes-No
  '(((FIELD OF ! [   ?)
       Field-Yes-No Table-Term Yes-No-Field-Form)
    ((ASK [ ?)
       Ask-Yes-No Text-Form)
    ((? IF ?   ?)
       Then-If Yes-No-Form Yes-No-Form Yes-No-Case)
    ((?    FOR THE ?)
       For-The Yes-No-Form Stream-Form)
    (Try Quantified-Form)
    (Try Yes-No-Form)
    ((?)
       Self Valid-Yes-No-Expression)
) )
; Parses simple arithmetic expressions.
;
(setq Yes-No-Form
  '(((? OR ? @ OR)
       or Yes-No-Form Yes-No-Form)
    ((? AND ? @ AND)
       and Yes-No-Form Yes-No-Form)
    ((NOT ?)
       not Yes-No-Form)
    ((? IS NOT ?)
       equal Text-Form Text-Form)
    ((? IS ?)
       Not-Equal Text-Form Text-Form)
    ((? = ?)
       = Number-Form Number-Form)
    ((? /= ?)
       /= Number-Form Number-Form)
    ((? > ?)
       > Number-Form Number-Form)
    ((? < ?)
       < Number-Form Number-Form)
    ((? >= ?)
       >= Number-Form Number-Form)
    ((? <= ?)
       <= Number-Form Number-Form)
    (((?))
       Paren Yes-No-Form)
    ((!)
       Self Yes-No-Term)
) )

; Parses rest of a yes-no case statement.
;
(setq Yes-No-Case
  '(((? IF ?   ?)
```

```
            Then-If Yes-No-Form Yes-No-Form Yes-No-Case)
    ((? IF ?)
        Otherwise-If Yes-No-Form Yes-No-Form)
    ((? OTHERWISE)
        Otherwise Yes-No-Form)
) )

; Parses quantifier yes-no expressions.
;
(setq Quantified-Form
 '(((FOR SOME ?   ?)
        For-Some Stream-Form Yes-No-Form)
   ((FOR EVERY ?   ?)
        For-Every Stream-Form Yes-No-Form)
   ((FOR NO ?   ?)
        For-No Stream-Form Yes-No-Form)
) )
; Parses yes-no field forms.
;
(setq Yes-No-Field-Form
 '(((DEFAULT VALUE ?)
        Default-Value Yes-No-Form)
   ((VALUES ? @   )
        Values Yes-No-Form)
   ((REQUEST ?)
        Request Text-Form)
) )

;----------------------------------------;

; Parses definitions of streams.
;
(setq Stream
 '((Try Table)
   (Try Stream-Form)
   ((?)
       Self Valid-Stream-Expression)
) )

; Parses definitions of tables.
;
(setq Table
 '(((STORED TABLE)
        Stored-Table)
   ((REQUESTED TABLE)
        Requested-Table)
   ((CONSTANT TABLE)
        Constant-Table)
) )

; Parses simple streams.
;
(setq Stream-Form
 '(((? WHERE ?)
        Where Stream-Term Yes-No-Form)
   ((!)
        Self Stream-Term)
) )
```

```
;-------;
; MATCH ;  - Does template matching for CONVERT.
;-------;

; Sees if Syms matches Tmps.
; If so, returns list of symbols matched by each wildcard
; or T if there are no wildcards.
; Otherwise, returns nil.
;   !  - matches exactly one element.
;   ?  - matches one or more element.
;  (?) - means one parenthetic element.
;   [  - mean that the rest of the template is optional.
;   @  - means repeat previous wildcard zero or more times,
;        seperated by the (optional) symbol which follows the @.
; Eg, (? + ? @ +) matches (A + B + C + D)
;     (MAX ! @)   matches (MAX A (B + C) D)
;     (ASK ? @ )  matches (ASK A  B   C)
;
(defun Match (Syms Tmps)
  (if (listp Syms)
    (let ((Matches    ())
          (Scanning   nil)
          (End-Of-Sym (length Syms))
          (End-Of-Tmp (length Tmps))
          (Sym-Ptr    0)
          (Tmp-Ptr    0)
          (Mark       0))
      (loop
        (let ((Sym (nth Sym-Ptr Syms))
              (Tmp (nth Tmp-Ptr Tmps)))
          (cond
            ((and (= Tmp-Ptr End-Of-Tmp)
                  (= Sym-Ptr End-Of-Sym))
             (Record Mark End-Of-Sym)
             (if Matches
               (return Matches)
               (return t)))
            ((= Tmp-Ptr End-Of-Tmp)
             (unless Scanning (return nil))
             (Record Mark End-Of-Sym)
             (return Matches))
            ((equal Tmp '@)
             (setq Tmp (nth (1+ Tmp-Ptr) Tmps))
             (cond
               ((null Tmp)
                (if (= Sym-Ptr End-Of-Sym)
                  (incf Tmp-Ptr)
                  (decf Tmp-Ptr))
                (setq Scanning nil))
               ((Find-Tmp Tmp)
                (Record Mark Sym-Ptr)
                (decf Tmp-Ptr)
                (incf Sym-Ptr)
                (setq Mark Sym-Ptr)
                (setq Scanning nil))
               (t
                (incf Tmp-Ptr 2))))
```

```
            ((equal Tmp '[)
              (if (= Sym-Ptr End-Of-Sym)
                (setq Tmp-Ptr End-Of-Tmp)
                (incf Tmp-Ptr)))
            ((= Sym-Ptr End-Of-Sym)
              (return nil))
            ((equal Tmp '?)
              (Record Mark Sym-Ptr)
              (setq Mark Sym-Ptr)
              (incf Sym-Ptr)
              (incf Tmp-Ptr)
              (setq Scanning t))
            ((equal Tmp '!)
              (Record Mark Sym-Ptr)
              (setq Mark Sym-Ptr)
              (incf Sym-Ptr)
              (incf Tmp-Ptr)
              (setq Scanning nil))
            ((equal Tmp '(?))
              (if (atom Sym)
                (return nil))
              (setq Matches (append Matches (list Sym)))
              (incf Sym-Ptr)
              (incf Tmp-Ptr)
              (setq Mark Sym-Ptr)
              (setq Scanning nil))
            ((equal Tmp Sym)
              (Record Mark Sym-Ptr)
              (incf Tmp-Ptr)
              (incf Sym-Ptr)
              (setq Mark Sym-Ptr)
              (setq Scanning nil))
            (Scanning
              (incf Sym-Ptr))
            (t (return nil))
)))))

; Adds elements of Syms between Mark and End-Of-Mark.
;
(defun Record (Mark End-Of-Mark)
  (if (< Mark End-Of-Mark)
    (setq Matches
      (append Matches
              (list (subseq Syms Mark End-Of-Mark))
))))

; Tries to find Tmp in Syms starting at Sym-Ptr.
; If found, sets Sym-Ptr to the match and returns true.
; Else returns NIL.
;
(defun Find-Tmp (Tmp &aux Sym-Ptr*)
  (setq Sym-Ptr* Sym-Ptr)
  (loop
    (cond
```

```
      ((equal (nth Sym-Ptr* Syms) Tmp)
         (setq Sym-Ptr Sym-Ptr*)
         (return t))
      ((= Sym-Ptr* End-Of-Sym)
         (return nil)))
    (incf Sym-Ptr*)
) )

;--------;
; STORE  ; - Store, retrieve, and display definition of SOCRATES terms
;--------;

(defvar Term-List)     ; List of current terms.
(defvar Scroll-Size)   ; Number of lines to fit in widow.

; Stores Def and Type of Term.
; Adds Term to Term-List, if not already there.
; Overrides existing definition, if present.
;
(defmacro Define2 (Term Type Def) (Set-Def ',Term ',Type ',Def))
(defun Set-Def (Term Type Def)
  (setf Term-List (adjoin Term Term-List))
  (setf (get Term :TERM-TYPE) Type)
  (if Def
    (setf (get Term :TERM-DEF)  Def)
    (push Term Undefined-Term-List)
) )

; Returns definition of Term or NIL.
;
(defun Get-Def (Term)
  (get Term :TERM-DEF)
)

; Sets Type of Term.
; Adds Term to Term-List if not already there.
;
(defun Set-Type (Term Type)
  (setf Term-List (adjoin Term Term-List))
  (setf (get Term :TERM-TYPE) Type)
)

; Returns type of Term or NIL.
;
(defun Get-Type (Term)
  (get Term :TERM-TYPE)
)

; Sets Val of Term.
;
(defun Set-Val (Term Val)
  (setf (get Term :TERM-VAL) Val)
)
```

```
; Returns value of Term or NIL.
;
(defun Get-Val (Term)
  (get Term :TERM-VAL 'UNKNOWN)
)

; Removes Term as a definition.
; Returns T if the definition existed, else NIL.
;
(defmacro Forget (&optional Term)  (Forget* ',Term))
(defun Forget* (&optional Term)
  (if Term
    (Then
      (setf Term-List (remove Term Term-List))
      (setf Undefined-Term-List (remove Term Undefined-Term-List))
      (remprop Term :TERM-DEF)
      (remprop Term :TERM-TYPE)
      (remprop Term :TERM-VAL))
    (mapc #'Forget* Term-List)
) )

; Returns list of terms on the Term-List which have no definition.
;
(defun Terms-To-Be-Defined ()
  (remove-if #'Get-Def Term-List)
)

; Displays one Term or all current terms.
;
(defmacro Know (&optional Term)  (Know* ',Term))
(defun Know* (&optional Term)
  (if Term
    (Show-Term-Def Term)
    (Else
      (Scroll t)
      (dolist (Term (reverse Term-List))
        (Show-Term-Def Term))
      (format t "ç% (çD termç@[sç])"
                (length Term-List)
                (/= 1 (length Term-List))
) ) ) )

; Allows displays of lists to scroll.
;
(defun Scroll (&optional Init)
  (if Init
    (setq Scroll-Size 19)
    (Else
      (decf Scroll-Size)
      (when (zerop Scroll-Size)
        (read-char)
        (setq Scroll-Size 19)
) ) ) )

; Lists the name of all terms with Str in their name.
;
 defmacro Terms (&optional Str)  (Terms* ',Str))
```

```
(defun Terms* (&optional Str &aux Terms)
  (if Str
    (setq Terms (Intersect (apropos-list Str) Term-List))
    (setq Terms (reverse Term-List)))
  (Scroll t)
  (dolist (Term Terms)
    (Scroll)
    (format t "ç%çA" Term)
) )

; Lists the name and value of all terms with a value.
;
(defun Known (&aux Val)
  (Scroll t)
  (dolist (Term Term-List)
    (setq Val (Get-Val Term))
    (unless (equal Val 'UNKNOWN)
      (Scroll)
      (format t "ç%çA = çA" Term (Display-Val Val))
) ) )

; Lists definitions of all terms with Str in their name.
;
(defmacro Find (Str) (Find* ',Str))
(defun Find* (Str)
  (let ((Terms (Intersect (apropos-list Str) Term-List)))
    (Scroll t)
    (dolist (Term Terms)
      (Show-Term-Def Term)
) ) )

; Returns the intersection of two lists.
;
(defun Intersect (Lst1 Lst2)
  (remove-if #'(lambda (Elem) (not (member Elem Lst1))) Lst2)
)

; Displays definition of Term.
;
(defun Show-Term-Def (Term &aux Def-Str)
  (setq Def-Str (Def-To-Str (Get-Type Term) (Get-Def Term)))
  (format t "ç%çA = " Term)
  (Prt-Indent Def-Str)
)

; Prints Str, indenting before each new line
;
(defun Prt-Indent (Str &aux (Len (length Str)))
  (do ((Start 0 (+ Start Chars))
       (Chars (- 76 (send *terminal-io* :cursorpos)) (+ Chars 71)))
      ((>= Start Len))
    (princ (subseq Str Start Chars))
    (Scroll)
    (when (< (+ Start Chars) Len) (princ "     "))
) )
```

```
; Saves external form of current definitions into Fie ".SAV"
;
(defmacro Save (File)  (Save* ',File))
(defun Save* (File)
  (let ((*standard-output*
          (open (string-append File ".SAV") :direction :output)))
    (dolist (Term (reverse Term-List))
      (Prt "(Define " Term " " (Get-Type Term) NL "   ")
      (prin1 (Def-To-Str (Get-Type Term) (Get-Def Term)))
      (Prt ")" NL))
    (close *standard-output*))
  (Prt NL "Definitions saved to file " (string-append File ".SAV"))
)
; Saves internal form of current definitions into File ".DMP"
;
(defmacro Dump (File)  (Dump* ',File))
(defun Dump* (File)
  (let ((*standard-output*
          (open (string-append File ".DMP") :direction :output)))
    (dolist (Term (reverse Term-List))
      (Prt "(Define2 " Term " " (Get-Type Term) NL "   ")
      (prin1 (Get-Def Term))
      (Prt ")" NL))
    (close *standard-output*))
  (Prt NL "Rules dumped to file " (string-append File ".DMP"))
)

; Loads previously saved rules from File.
;
(defmacro Restore (&optional File)  (Restore* ',File))
(defun Restore* (&optional File)
  (if File
    (Then
      (Forget*)
      (if (probe-file (string-append File ".DMP"))
        (load (string-append File ".DMP"))
        (load (string-append File ".SAV"))))
    (Else
      (Files ".SAV")
      (Files ".DMP"))
) )

; Lists all files in current directory
;
(defun Files (&optional (Ending "*"))
  (mapc
    #'(lambda (Name) (format t "ç%çA" (pathname-name Name)))
    (directory (string-append "*" Ending)))
  nil
)

; Prints multiple strings.
; Recognizes NL as a new line.
;
(defun Prt (&rest Strs)
  (dolist (Str Strs)
    (princ Str)
) )
```

```
(defconstant NL (string 10))

; Resets attached value for one or all terms.
;
(defmacro Reset (&optional Term)  (Reset* ',Term))
(defun Reset* (&optional Term)
   (if Term
     (Then
        (remprop Term :TERM-VAL)
        (mapc #'Reset* (Uses-Term Term)))
     (dolist (Term Term-List)
        (remprop Term :TERM-VAL)
) ) )

; Sets the attached value of Term.
;
(defmacro Assume (Term)  (Assume* ',Term))
(defun Assume* (Term)
   (push Term Arg-Stack)
   (remprop Term :TERM-VAL)
   (mapc #'Reset* (Uses-Term Term))
   (Set-Val Term
      (case (Get-Type Term)
         (Number (Ask-Number))
         (Number (Ask-Text))
         (Number (Ask-Yes-No))))
   (pop Arg-Stack)
)

; Displays definitions of all terms which reference Term.
;
(defmacro Uses (Term)  (Uses* ',Term))
(defun Uses* (Term)
   (Scroll t)
   (dolist (Parent-Term (Uses-Term Term))
      (Show-Term-Def Parent-Term)
) )

; Returns all terms which reference Term.
;
(defun Uses-Term (Term)
   (remove nil
      (mapcar
         #'(lambda (X) (if (member Term (Terms-Used X)) X))
         Term-List
) ) )
; Returns list of terms used in definition of Term.
;
(defun Terms-Used (Term)
   (Terms-In-Def (Get-Def Term))
)

; Renames Old to New and replaces every reference to Old to New.
;
(defmacro Rename (Old New)  (Rename* ',Old ',New))
(defun Rename* (Old New)
```

```
(Set-Def New (Get-Type Old) (Get-Def Old))
(Forget* Old)
(dolist (Term Term-List)
    (setf (get Term :TERM-DEF) (subst New Old (Get-Def Term)))
) )

; Replaces every reference to Old to New and deletes Old.
;
(defmacro Replace (Old New)  (Replace* ',Old ',New))
(defun Replace* (Old New)
    (Forget* Old)
    (dolist (Term Term-List)
        (setf (get Term :TERM-DEF) (subst New Old (Get-Def Term)))
) )
```

What is claimed is:

1. A digital computer system operable as an expert system, said computer system comprising:
   storage means to store a knowledge base including hierarchically-defined terms and their definitions, the corresponding definition of each term defining its respective term using the value of one or more terms, each of whose definitions is at a lower level of the hierarchy, and/or using one or more external values external to the knowledge base; and
   processing means for receiving commands from a user of the system, for producing inference commands in response to said user commands, for interrogating said storage means in response to said commands to obtain the definition of a given term, and for computing the value of said given term from its corresponding definition by obtaining the value of any term and any external value in the corresponding definition,
   said system employing said computed value to produce an expert response to said user.

2. The digital computer system operable as an expert system as set forth in claim 1 and wherein:
   the definition of a term further includes a plurality of operators for defining how the value of a term and/or an external value is to be used in the definition; and
   the processing means computes the value of said given term using the operators in the corresponding definition.

3. The digital computer system operable as an expert system as set forth in claim 2 and wherein:
   the value of a term or an external value may be of the Boolean, arithmetic, or string types; and
   the operators include a Boolean operator for operating on a Boolean value, an arithmetic operator for operating on an arithmetic value, and a text concatenation operator for operating on string values.

4. The digital computer system operable as an expert system as set forth in claim 3 and wherein:
   the operators further include a case operator for associating each value in a list of values with a Boolean expression and returning the first value in the list whose Boolean expression has the value "TRUE" as the value produced by the operator.

5. The digital computer system operable as an expert system as set forth in claim 1 and wherein:
   each definition corresponding to a term is a function definition; and
   the processing means computes the value of said given term by executing the function defined by the corresponding function definition.

6. The digital computer system operable as an expert system as set forth in claim 1 and wherein:
   the corresponding definition specifies the source of any external value used therein; and
   the processing means obtains the value of any external value from the specified source.

7. The digital computer system operable as an expert system as set forth in claim 6 and wherein:
   the storage means additionally includes a file and/or data base for storing values separate from knowledge base; and
   the processing means being capable of obtaining the value of the external value from the file and/or data base.

8. The digital computer system operable as an expert system as set forth in claim 6 and wherein:
   the digital computer system further comprises interactive input/output means coupled to the processor means for providing output information to and receiving input information from a user of the digital computer system; and
   the specified source is the interactive input/output means and the specification of the source includes a specification of output information output to the interactive means.

9. The digital computer system operable as an expert system as set forth in claim 8 and wherein:
   the specification of the output information includes a specification of a list of values; and
   the user specifies the external value by selecting one of the values on the list of values.

10. The digital computer system operable as an expert system as set forth in claim 1 and wherein:
    the user commands include a user command which specifies the given term and to which the processing means responds by producing the computed value as the expert response.

11. The digital computer system operable as an expert system as set forth in claim 1 and wherein:
    the user commands include a user command specifying the given term to which the processing means responds by producing an expert response derived from the definition which shows how the current value of the given term was computed using the corresponding definition.

12. The digital computer system operable as an expert system as set forth in claim 1 and wherein:

the user commands include a user command specifying the given term and an external value to which the processing means responds by using the specified external value to compute the computed value.

13. The digital computer system operable as an expert system as set forth in claim 1 and wherein:
the digital computer system further comprises interactive input/output means employed by the user to receive a request for a user command, a request for an external value, and the expert response from the digital computer system and to provide the user commands and the external value to the digital computer system; and
the user commands include a user command provided on the input/output means in responnse to the request for the external value to which the processor means responds by producing an expert response from the definition which shows why the external value is required for the computation.

14. The digital computer system operable as an expert system as set forth in claim 1 and wherein:
the storage means further includes means for retaining any external value used to produce the computed value; and
the user commands include a user command for altering one or more of the retained external values.

15. The digital computer system operable as an expert system as set forth in claim 14 and wherein:
the user command for altering one or more of the retained external values clears all of the retained external values.

16. The digital computer system operable as an expert system as set forth in claim 14 and wherein:
the user command for altering one or more of the value sets a specified one thereof to a new value specified in the user command.

17. The digital computer system operable as an expert system as set forth in claim 1 and wherein:
the user commands include a user command for specifying a new term to which the processing means responds by receiving input from the user as required to produce a definition in the knowledge base corresponding to the new term and definitions for any undefined terms required for the corresponding definition until there are no undefined terms remaining in the corresponding definition.

18. The digital computer system operable as an expert system as set forth in claim 1 and wherein:
the user commands include a user command for removing a term to which the processing means responds by removing the term and its definition from the knowledge base.

19. The digital computer system operable as an expert system as set forth in claim 1 and wherein:
the user commands include a user command for redefining a term to which the processing means responds by removing the definition for the term from the knowledge base and producing a new definition in the knowledge base corresponding to the redefined term and definitions for any undefined terms required for the new definition until there are no undefined terms remaining in the new definition.

20. The digital computer system operable as an expert system as set forth in claim 17 and wherein:
each corresponding definition is a definition of a function executable by the processing means and
the processing means computes the value of the given term by executing the function defined in the corresponding definition.

21. A digital computer system operable to define a given term for an expert system by creating a hierarchical definition of the given term for storage with the term in a knowledge base employed in the expert system comprising:
storage means for storing the knowledge base;
interactive input/output means for providing output information to and receiving input information from a user of the digital computer system who is the source of the definition; and
processing means coupled to the storage means and to the interactive input/output means for receiving the input information and providing the output information and receiving previously-defined terms and definitions and providing the given term and the definition created therefor and for responding to the given term received in the input information by providing output information requesting a description of the given term from the user, receiving input information containing the description from the user, analyzing the description to determine whether there is any term therein which does not have a definition in the knowledge base, and if there is not, ending the analysis, forming the definition for the given term from the description and the definitions of the previously-defined terms used therein, and storing the given term and the definition in the knowledge base, and if there is, providing output information requesting a description of the undefined term from the user and proceeding as for the given term, and continuing thus until no undefined term remains in the description of the given term or in any descriptions requested in the course of defining the given term.

22. The digital computer system as set forth in claim 21 and wherein:
each defined term represents a value;
the description of the defined term describes how the represented value is to be computed by the processing means; and
the definition of a given defined term is interpretable by the processing means to compute the value presently represented by the defined term.

23. The digital computer system as set forth in claim 22 and wherein:
each defined term is a function name;
the definition for the defined term is the function definition for the function name; and
the processing means determines the present value of the defined term by executing the function defined by the function definition.

24. The digital computer system as set forth in claim 22 and wherein:
the value of the defined term is computed using an external value external to the knowledge base;
the defined term's description includes a first specification of the source of the external value; and
the defined term's definition includes a second specification of the source of the external value which is interpetable by the processing means to obtain the external value from the specified source.

25. The digital computer system as set forth in claim 22 and wherein:
the description of a term describes how the value of the term is to be computed by means of specifications of one or more operators;
the definition of a term further includes operators corresponding to the specifications in the description; and
the processing means computes the value of said given term using the operators in the corresponding definition.

26. The digital computer system as set forth in claim 25 and wherein:
the value of a term may be of the Boolean, arithmetic, or string types; and
the operators include a Boolean operator for operating on a Boolean value, an arithmetic operator for operating on an arithmetic value, and a text concatenation operator for operating on string values.

27. The digital computer system as set forth in claim 26 and wherein:
the operators further include a case operator for associating each value in a list of values with a Boolean expression and returning the first value in the list whose Boolean expression has the value "TRUE" as the value produced by the operator.

28. The digital computer system as set forth in claim 24 and wherein:
the storage means additionally includes a file and/or data base for storing values separate from knowledge base; and
the processing means being capable of obtaining the value of the external value from the file and/or data base.

29. The digital computer system as set forth in claim 24 and wherein:
the specified source is the interactive input/output means and
the specification of the source includes a specification of output information output to the interactive means.

30. The digital computer system as set forth in claim 29 and wherein:
the specification of the output information includes a specification of a list of values; and
the user specifies the external value by selecting one of the values on the list of values.

31. The digital computer system as set forth in claim 21 and wherein:
the processing means creates the hierarchical definition in response to input information specifying the given term and that the given term be defined.

32. The digital computer system as set forth in claim 21 and wherein:
the processing means removes a previously-defined term and corresponding hierarchical definition from the knowledge base in response to input information specifying the previously-defined term and that the previously-defined term be removed from the knowledge base.

33. The digital computer system as set forth in claim 21 and wherein:
the processing means replaces the corresponding hierarchical definition for a previously-defined term with a new definition in response to input information specifying the previously-defined term and that the previously-defined term is to be redefined.

* * * * *